United States Patent
Sohn et al.

(10) Patent No.: US 9,724,632 B2
(45) Date of Patent: Aug. 8, 2017

(54) AIR CLEANER

(71) Applicant: LG ELECTRONICS INC., Seoul (KR)

(72) Inventors: Yongjoon Sohn, Seoul (KR); Taeyoon Kim, Seoul (KR); Jeeman Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 14/556,850

(22) Filed: Dec. 1, 2014

(65) Prior Publication Data
US 2015/0273378 A1 Oct. 1, 2015

(30) Foreign Application Priority Data

Mar. 28, 2014 (KR) .................. 10-2014-0037308
Apr. 4, 2014 (KR) .................. 10-2014-0040790

(51) Int. Cl.
*B01D 46/00* (2006.01)
*B01D 46/12* (2006.01)
*B01D 46/42* (2006.01)

(52) U.S. Cl.
CPC ..... *B01D 46/0024* (2013.01); *B01D 46/0005* (2013.01); *B01D 46/0038* (2013.01); *B01D 46/12* (2013.01); *B01D 46/4227* (2013.01)

(58) Field of Classification Search
None
See application file for complete search history.

(56) References Cited

U.S. PATENT DOCUMENTS 2,061,535 A 11/1936 Davies
2,072,548 A * 3/1937 Donaldson ......... B01D 46/0024
55/DIG. 27

(Continued)

FOREIGN PATENT DOCUMENTS

CN 2030899 1/1989
CN 2415295 1/2001

(Continued)

OTHER PUBLICATIONS

U.S. Appl. No. 14/556,951, filed Dec. 1, 2014.

(Continued)

*Primary Examiner* — Christopher P Jones
*Assistant Examiner* — Britanny Precht
(74) *Attorney, Agent, or Firm* — KED & Associates LLP

(57) ABSTRACT

An air cleaner is provided. The air cleaner may include a circular filter assembly, in which a plurality of filters may be stacked, a circular rear or first case including a mount sleeve, on which the filter assembly may be mounted, a circular middle or second case, on which a discharge grille may be disposed, the second case being coupled to a front or first surface of the first case, a circular front or third case coupled to a front or first surface of the second case, and a circular panel attached to a surface of the third case. The filter assembly may include a first filter, a second filter disposed at a side of the first filter to accommodate the first filter, and a third filter disposed at a side of the second filter to accommodate the second filter. Edges of surfaces of the first to third filters may be flush with each other.

13 Claims, 29 Drawing Sheets

(56) References Cited

U.S. PATENT DOCUMENTS

| | | | |
|---|---|---|---|
| 3,308,610 A * | 3/1967 | Springer | A01G 15/00 55/471 |
| 3,385,573 A * | 5/1968 | Gilman | B01D 46/0021 261/24 |
| 4,235,609 A * | 11/1980 | Garigioli | B01D 46/0024 55/485 |
| 4,236,902 A | 12/1980 | Fricke | |
| 4,629,482 A * | 12/1986 | Davis | B01D 46/0005 55/385.2 |
| 4,704,143 A * | 11/1987 | Percy | B01D 46/0006 123/198 E |
| 4,826,513 A * | 5/1989 | Stackhouse | A61L 9/16 96/131 |
| 5,204,068 A * | 4/1993 | O'Loughlin | B01D 39/2041 280/736 |
| 5,227,074 A * | 7/1993 | Nichols | A61L 2/26 206/363 |
| 5,238,474 A * | 8/1993 | Kahlbaugh | B01D 39/14 55/320 |
| 5,288,298 A * | 2/1994 | Aston | B01D 46/001 55/485 |
| 5,368,621 A * | 11/1994 | Pool | B01D 46/001 123/198 E |
| 5,435,817 A | 7/1995 | Davis | |
| 5,470,176 A * | 11/1995 | Corcoran | B01D 46/0013 404/72 |
| D365,388 S | 12/1995 | Williams | |
| D365,389 S | 12/1995 | Williams | |
| 5,592,933 A * | 1/1997 | Zucchi | A61M 16/1045 128/201.13 |
| D383,202 S | 9/1997 | Meister | |
| 5,753,000 A | 5/1998 | Chiu | |
| D398,045 S | 9/1998 | Jane | |
| 5,800,588 A | 9/1998 | Miller | |
| D416,317 S | 11/1999 | Bellil | |
| D416,613 S | 11/1999 | Bellil | |
| 6,036,757 A | 3/2000 | Gatchell | |
| D423,659 S | 4/2000 | Schippanoski | |
| 6,136,055 A | 10/2000 | Stanek | |
| 6,156,085 A | 12/2000 | Chiu | |
| 6,764,532 B1 * | 7/2004 | Cheng | B01D 46/0024 428/179 |
| 7,132,007 B1 * | 11/2006 | von Blucher | B01D 53/02 95/273 |
| 7,396,375 B2 * | 7/2008 | Nepsund | B01D 46/0004 123/198 E |
| 7,905,936 B2 * | 3/2011 | Coulonvaux | B01D 46/0023 55/357 |
| 7,993,589 B1 * | 8/2011 | Shigemoto | A61L 9/01 422/122 |
| 8,043,398 B2 * | 10/2011 | Ito | B01D 46/0086 422/177 |
| 8,882,451 B2 * | 11/2014 | Fitton | F04D 25/084 415/121.2 |
| 2004/0161373 A1 * | 8/2004 | Ichikawa | B01D 46/0001 422/180 |
| 2004/0255785 A1 * | 12/2004 | Koslow | A62B 23/02 96/154 |
| 2005/0132681 A1 * | 6/2005 | Chu | F24F 3/1411 55/471 |
| 2005/0168907 A1 * | 8/2005 | Sekoguchi | A61L 9/22 361/230 |
| 2005/0205484 A1 * | 9/2005 | Diel | B01D 29/15 210/323.1 |
| 2006/0032198 A1 * | 2/2006 | Cha | B01D 46/12 55/418 |
| 2006/0201119 A1 | 9/2006 | Song | |
| 2007/0012192 A1 * | 1/2007 | Pippel | B01D 46/0005 96/417 |
| 2007/0066215 A1 * | 3/2007 | Song | B01D 46/0004 454/329 |
| 2008/0083337 A1 * | 4/2008 | Yamanaka | A61L 9/042 96/222 |
| 2011/0173936 A1 * | 7/2011 | Burns | B01D 46/0024 55/411 |
| 2014/0190883 A1 * | 7/2014 | Handa | C02F 1/003 210/337 |
| 2014/0224127 A1 * | 8/2014 | Nagata | B01D 46/0038 96/134 |

FOREIGN PATENT DOCUMENTS

| | | |
|---|---|---|
| CN | 2441067 | 8/2001 |
| CN | 2588264 | 11/2003 |
| CN | 2670804 | 1/2005 |
| CN | 1784258 | 6/2006 |
| CN | 1853759 | 11/2006 |
| CN | 201028707 | 2/2008 |
| CN | 101176835 | 5/2008 |
| DE | 659512 C | 5/1938 |
| DE | 19505723 A1 | 8/1996 |
| DE | 202008013888 U1 | 3/2010 |
| EP | 1 391 231 | 2/2004 |
| EP | 1975383 | 10/2008 |
| KR | 10-2005-0102227 A | 10/2005 |
| KR | 10-0621247 | 9/2006 |
| KR | 10-2008-0041062 | 5/2008 |
| KR | 10-0956850 | 5/2010 |
| KR | 10-1152512 | 6/2012 |
| KR | 20-0462725 | 9/2012 |

OTHER PUBLICATIONS

European Search Report date Nov. 5, 2015.
U.S. Office Action dated Sep. 6, 2016 issued in co-pending U.S. Appl. No. 14/556,951.
Korean Office Action dated Aug. 6, 2015, (10-2014-0040790).
Korean Office Action dated Aug. 6, 2015. (10-2014-0040791).
LG Electronics Launches 2014 Model Air Purifier; "No more worrying about Asian Dust, Fine Dust"; [Source: http://review.chosun.com Mar. 12, 2014]; pp. 1-9 (English Translation).
LG Electronics Air Purifier Designed to be a "Comma" in Daily Life; [Source: Media It dated Mar. 26, 2014]; pp. 1-9 (English Translation).
LG Electronics Launches New Air Purifier Differentiated by Design and Performance; [Source: Herald Report www.heraldr.co.kr on Mar. 12, 2014] pp. 1-8 (English Translation).
European Search Report dated Oct. 23, 2015.
Chinese Office Action dated Apr. 6, 2017 issued in Application No. 201410652498.X.

* cited by examiner

AIR CLEANER

CROSS-REFERENCE TO RELATED APPLICATION(S)

The present application claims priority under 35 U.S.C. 119 and 35 U.S.C. 365 to Korean Patent Application Nos. 10-2014-0037308, filed in Korea on Mar. 28, 2014, and 10-2014-0040790, filed in Korea on Apr. 4, 2014, which are hereby incorporated by reference in their entirety.

BACKGROUND

1. Field

An air cleaner is disclosed herein.

2. Background

Air cleaning apparatuses are apparatuses to purify polluted air into fresh air. More particularly, polluted air is suctioned by a fan to pass through a filter, thereby collecting fine dust or germs and deodorizing the air to remove odors, such as cigarette smell. Such an air cleaning apparatus according to the related art is disclosed in Korean Patent Registration No. 10-0564497, which is incorporated herein by reference.

Air cleaning apparatuses may be classified into mechanical air cleaning apparatuses, electronic air cleaning apparatuses, and ion air cleaning apparatuses. Among these air cleaning apparatuses, the mechanical air cleaning apparatuses may use a method in which a dust collection filter is used to filter air passing therethrough and absorb odor, thereby purifying the air. In such a mechanical air cleaning apparatus, although foreign substances contained in air are effectively removed, a filter has to be periodically replaced. In addition, it may be difficult to effectively remove viruses or germs. Also, in the case of the air cleaning apparatuses according to the related art, it may be difficult to replace each of the plurality of filters that filter object of different sizes.

BRIEF DESCRIPTION OF THE DRAWINGS

Embodiments will be described in detail with reference to the following drawings in which like reference numerals refer to like elements, and wherein.

DETAILED DESCRIPTION

Figure 1:
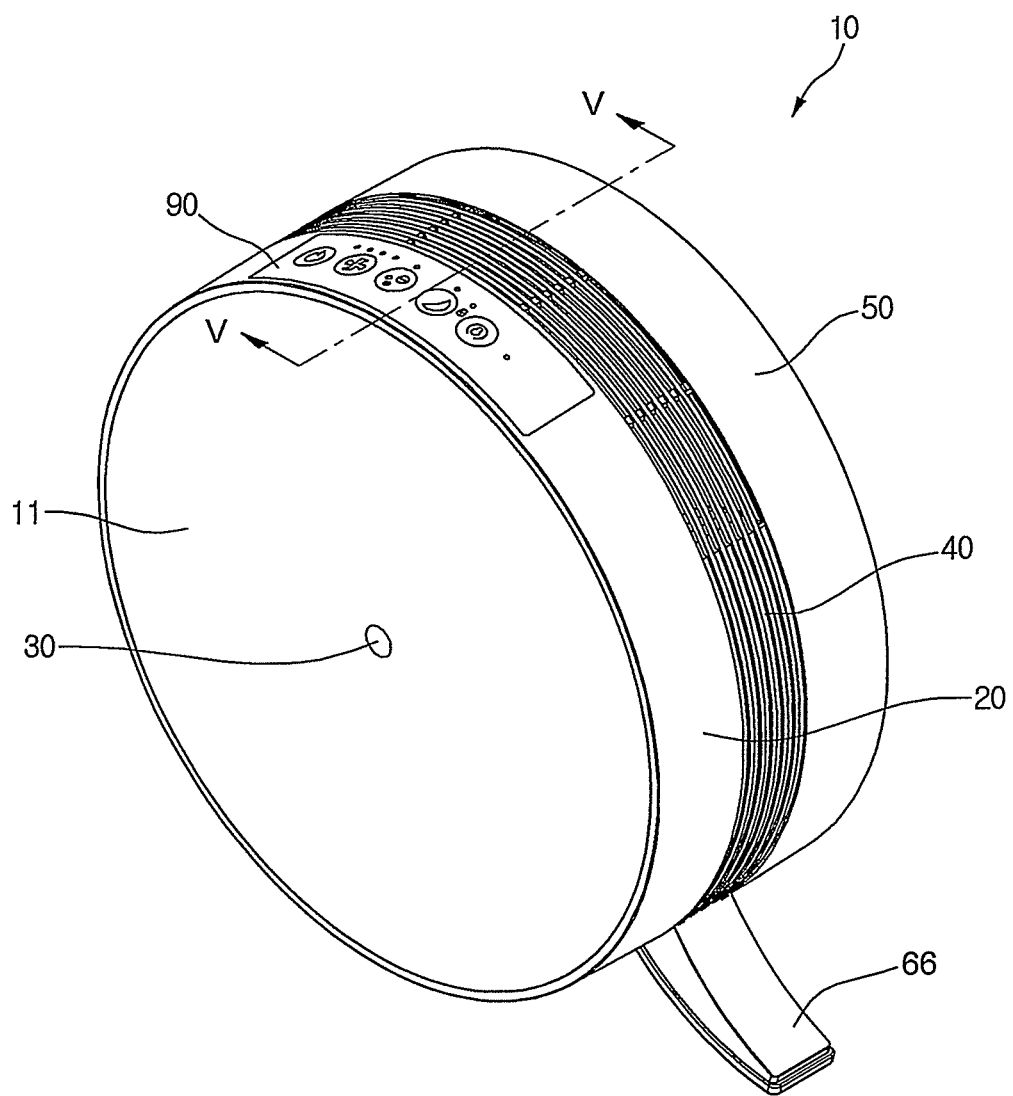
FIG. 1 is a front perspective view of an air cleaner according to an embodiment.

Hereinafter, an air cleaner according to embodiments will be described in detail with reference to the accompanying drawings. Where possible, like reference numerals have been used to indicate like elements, and repetitive disclosure has been omitted.

Figure 2:
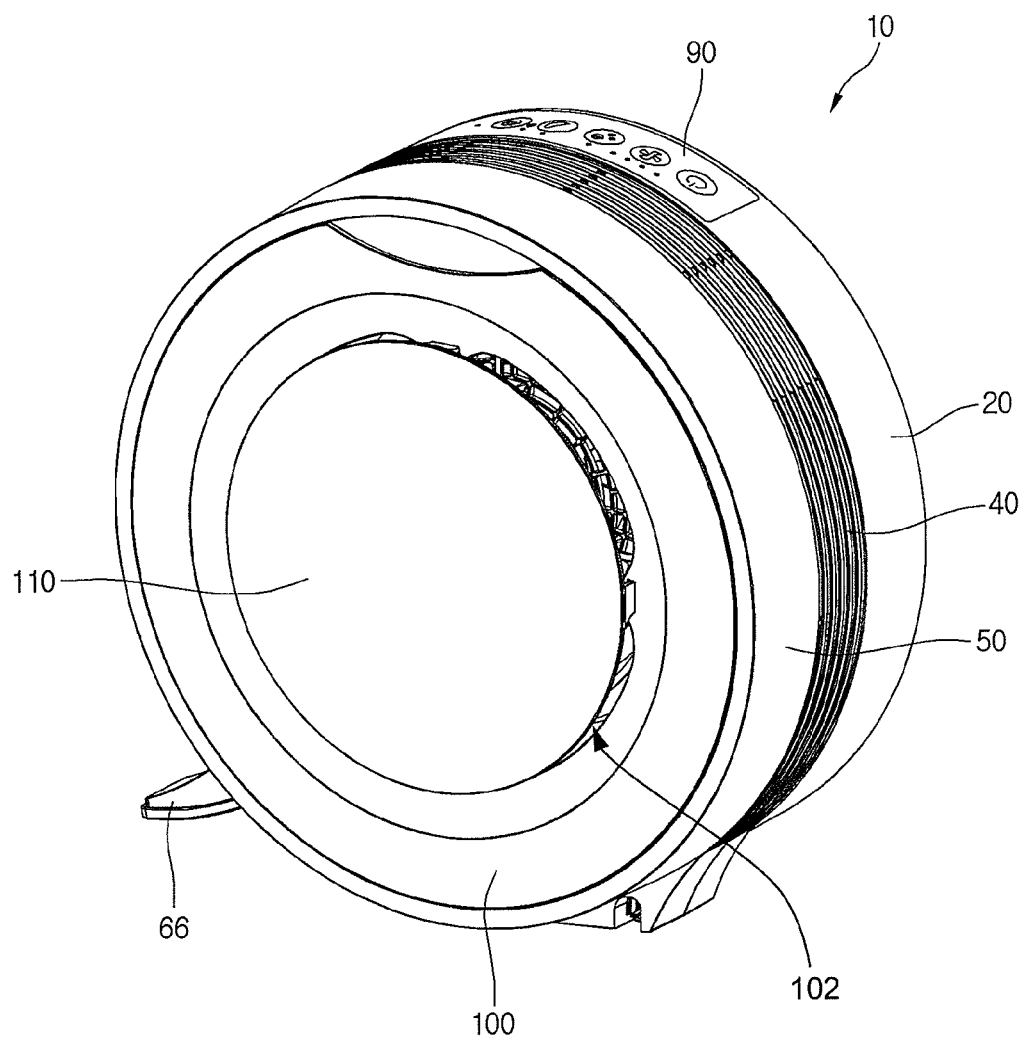
FIG. 2 is a rear perspective view of the air cleaner of FIG. 1.
Figure 3:
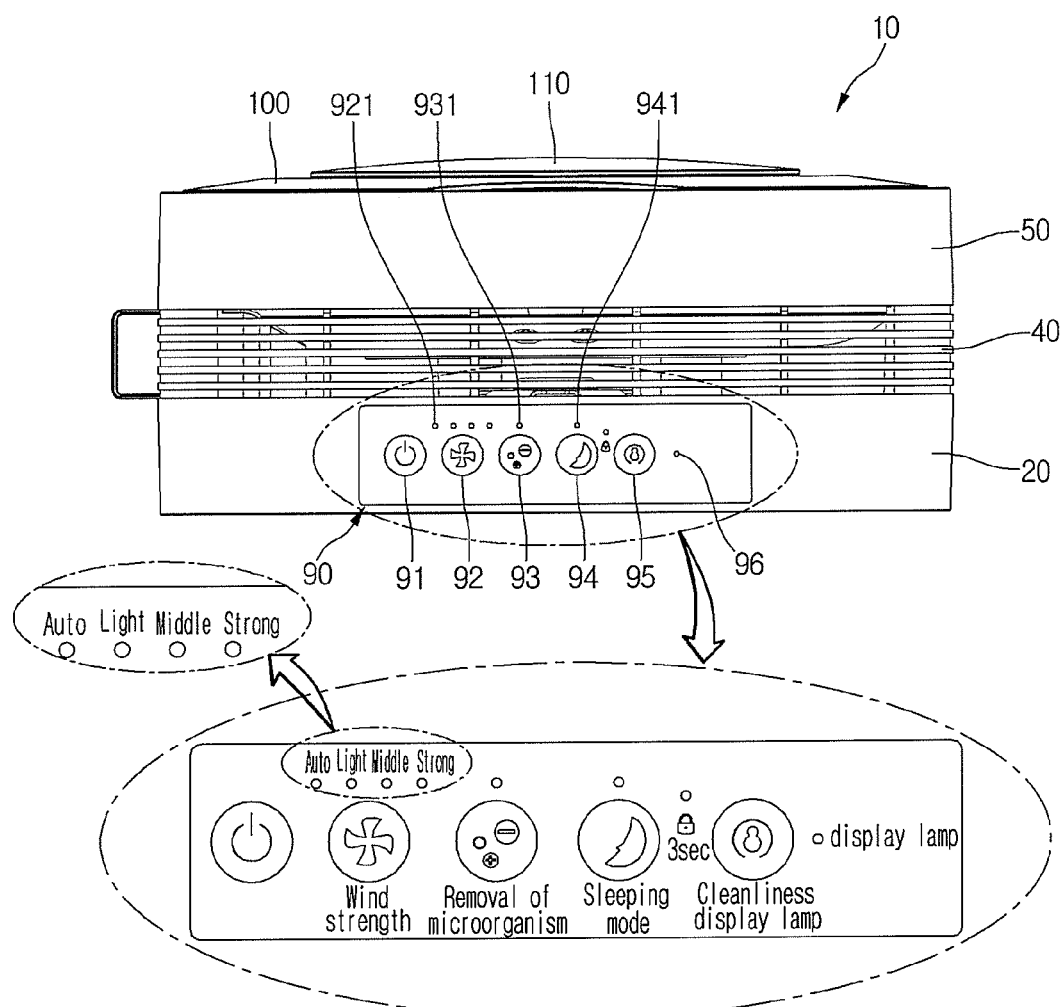
FIG. 3 is a plan view of the air cleaner of FIG. 1.
Figure 4:
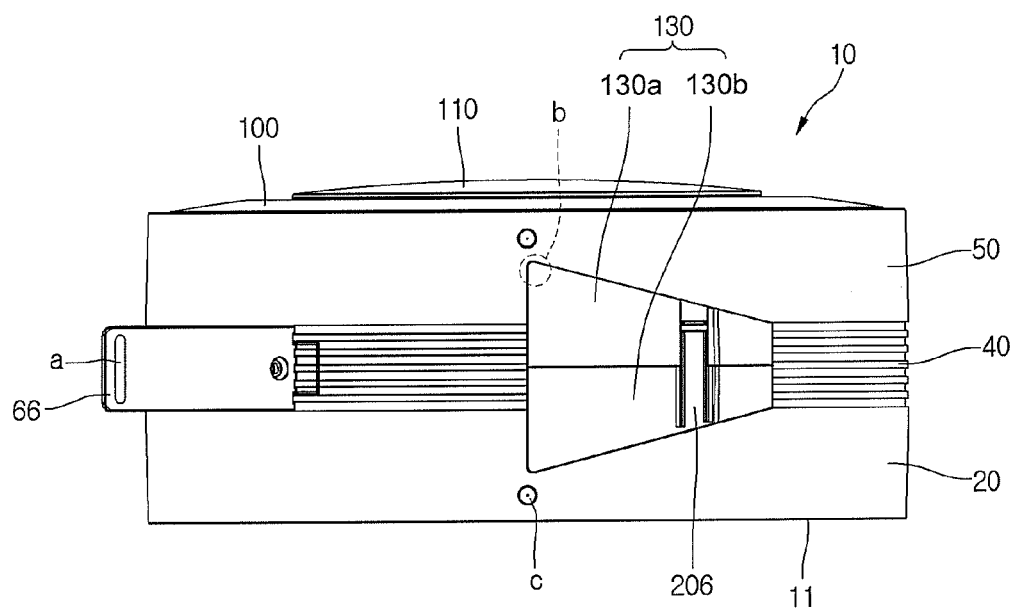
FIG. 4 is a bottom view of the air cleaner of FIG. 1.

FIG. 1 is a front perspective view of an air cleaner according to an embodiment. FIG. 2 is a rear perspective view of the air cleaner of FIG. 1. FIG. 3 is a plan view of the air cleaner of FIG. 1. FIG. 4 is a bottom view of the air cleaner of FIG. 1.

Referring to FIGS. 1 to 4, an air cleaner 10 according to an embodiment may include a case defining an exterior of the air cleaner 10, and a leg 66 and a support 130, which may be connected to a lateral edge of a bottom surface of the case to stably support the air cleaner 10. The leg 66 and the support 130 may be disposed on the bottom surface of the case to face each other. That is, the leg 66 may be disposed on one or a first side of lateral edges of the case, and the support 130 may be disposed on the other or a second side of the lateral edges of the case.

The case may include a front case 20 disposed on a front side of the air cleaner 10, a middle case 40 coupled to a rear surface of the front case 20, and a rear case 50 coupled to a rear surface of the middle case 40. The air cleaner 10 according to embodiments may generally have a cylindrical shape due to the cases 20, 40, and 50.

The air cleaner 10 may further include a rear panel 100 and a cover panel 110. The rear panel 100 may be coupled to a rear surface of the rear case 50, and an air suction hole 102 may be defined inside of the rear panel 100. The cover panel 110 may be coupled to the rear panel 100 to cover the air suction hole 102. In more detail, the cover panel 110 may be coupled to be spaced apart from the rear panel 100. Thus, indoor air may be suctioned between the cover panel 110 and the rear panel 100, and the suctioned air may be introduced into the case through the air suction hole 102.

A discharge hole to discharge filtered fresh air into an indoor space may be defined in an upper portion of the middle case 40. A front panel 11 may be attached to a front surface of the front case 20, and a cleanliness display module 30 may be disposed on or at a center of the front panel 11. The front panel 11 may be a plate in which a spin hairline is formed in a metal material. Light emitted onto the front panel 11 may be radially spread from a center of the front panel 11 to provide an elegant product.

Although not shown, an LCD panel or OLED panel may be attached to a back surface of the front panel 11 to display an image or moving picture. That is, the front panel 11 may serve as a display. For example, a moving picture or image may be displayed through the front panel 11 according to an air flow rate mode or indoor cleanliness (or a pollution level) set by a user.

The cleanliness display module 30 may be disposed on or at an exact center of the front panel 11. A light emitting member that varies in color according to a pollution level of air may be disposed within the cleanliness display module 30 to perform a cleanliness display lighting function. For example, when the air pollution level is high, the light emitting member may emit red light. On the other hand, as the air pollution level decreases, the light emitting member may emit light that changes from a yellow color to a green color. The user may visually confirm the cleanliness of the indoor air by the cleanliness display lighting function.

A control panel 90 may be disposed on an upper surface of the front case 20 to allow the user to input various operation commands and confirm a filter replacement period. A display to display various information including an operation state or indoor air state using, for example, characters, figures, images, or moving pictures may be disposed on the control panel 90. The display may include the LCD panel or the OLED panel.

The control panel 90 may include a power button 91 that turns the air cleaning apparatus 10 on/off, an air flow rate selection button 92 to select wind strength, an anion selection button 93, a sleeping mode selection button 94 to select a sleeping mode, and a cleanliness display lamp button 95. When the power button 91 is pushed, an operation to clean air may start. Simultaneously, a lamp disposed on the cleanliness display module 30 may be turned on. The lamp of the cleanliness display module 30 may be a color according to the pollution level of the indoor air.

A plurality of air flow rate display lamps 921 to display wind strength may be disposed at a predetermined distance above the air flow rate selection button 92. Also, a character to inform wind strength may be disposed on the air flow rate display lamp 921. For example, wind strength may be divided into an automatic wind mode, a light wind mode, a middle wind mode, and a strong wind mode. The user may push the air flow rate selection button 92 to set the wind strength. In the automatic wind mode, an air flow rate may be automatically adjusted according to the pollution level of the indoor air. For example, as the pollution level of the indoor air increases, the air flow rate may be set to increase. On the other hand, as the pollution level of the indoor air decreases, the air flow rate may be set to decrease. That is, a controller may automatically control the air flow rate on the basis of a pollution level value transmitted from a sensor that detects the pollution level.

The lamp of the cleanliness display module 30 may be switched on and off using a white color for a time taken to stabilize the sensor after the operation starts. After the sensor is stabilized, the lamp may be turned on with a color corresponding to the pollution level of the indoor air. A time of about 2 minutes may be taken to stabilize the sensor. Also, the lamp of the cleanliness display module 30 may be interlocked with the air flow rate to change in color. That is, if the pollution level of the indoor air is high, the air flow rate may increase, and simultaneously, the color of the lamp of the cleanliness display module 30 may change into a red color. On the other hand, if the pollution level of the indoor air gradually decreases, the color of the lamp of the cleanliness display module 30 may change from a yellow color to a green color.

When the anion selection button 93 is pushed, anions may be generated in an anion generation device, which is discussed hereinbelow, to remove various germs contained in the air. Whenever the anion selection button 93 is pushed once, the function may change in order of sterilization→release→sterilization. An anion generation lamp 931 may be disposed above the anion selection button 93. When the anion generation function is selected, the anion generation lamp 931 may be turned on to allow the user to confirm whether the anion generation mode is currently executed.

A sleeping mode lamp 941 may be disposed above the sleeping mode selection button 94. When the sleeping mode selection button 94 is pushed, a low noise state for sleeping may be implemented. In the case of the sleeping mode, only the sleeping mode lamp 941 may be turned on. The cleanliness display lamp may be turned off to assist a deep sleep of the user. When the sleeping mode selection button 94 is pushed, the air cleaner may operate in the light wind mode for an initial set or predetermined period of time, for example, one hour, and then the wind strength may be automatically adjusted according to the cleanliness. Also, while the air cleaner operates in the sleeping mode, the air flow rate selection button 92 may be pushed to directly adjust the wind strength. When the sleeping mode selection button 94 is pushed once more, the sleeping mode may be released. The user may additionally set the cleanliness display lamp activation and the anion generation function even in the sleep mode.

In addition, when the sleeping mode selection button 94 and the cleanliness display lamp button 95 are pushed at the same time for a preset or predetermined period of time, for example, three seconds, a locking function may be executed to protect the product against children or undesired operations due to other factors. To release the locking function, the sleeping mode selection button 94 and the cleanliness display lamp button 95 may be pushed again at the same time for the preset or predetermined period of time, for example, three seconds. The set-up and release of the locking function may be performed while the air cleaner operates, as well as while the operation of the air cleaner is stopped.

A filter replacement lamp 96 may be disposed beside the cleanliness display lamp button 95. When the filter replacement lamp 96 is turned on, this may represent that a filter replacement time has arrived. Thus, the air cleaner needs to be turned off to replace the filter.

As illustrated in FIG. 4, the leg 66 and support 130 may be disposed on a bottom surface of the air cleaner 10 to stably place the air cleaner 10 on an installation surface. The leg 66 may be fixedly, foldably, or separably mounted on the bottom surface of the air cleaner 10.

The support 130 may include a rear support 103a disposed on a bottom surface of the rear case 50 and a front support 103b disposed on a bottom surface of the front case 20. The rear support 103a and the front support 103b may have shapes that are symmetrical to each other. When the rear case 50 and the front case 20 are coupled to each other, the rear case 50 and the front case 20 may be coupled to each other using, for example, a hook 206.

A friction member or support protrusion a may be disposed on or at a side of a bottom surface of the leg 66, that is, a portion that contacts the installation surface. Also, one or more friction member or support protrusion c may be disposed on a front portion of the bottom surface of the front case 20 and/or a rear position of the rear case 50. A rear end b of the rear support 103a may contact the installation surface. Thus, when the air cleaner 10 is installed on the installation surface, the support protrusion a of the leg 66, the one or more support protrusion c, and the rear end b of the rear support 103a may contact the installation surface to support the air cleaner 10 at three points.

In general, when an object placed on a flat installation surface is supported by at least four points, the object may not be stably fixed to the installation surface, but may be shaken in one direction. However, if the object is placed on the installation surface at three points, the object may be stably supported without being shaken.

Also, the one or more support protrusion c disposed on the bottom surface of the front case 20 may further protrude from the rear end b of the support 130. Thus, when the air cleaner 10 is placed on the installation surface, the air cleaner 10 may be slightly inclined backward. This is done to prevent the air cleaner 10 from falling down due to a weight of a fan motor, which will be discussed hereinbelow, because the fan motor to drive a blower fan of the air cleaner 10 may be mounted at a position biased forward from a center of the air cleaner 10.

Figure 5:
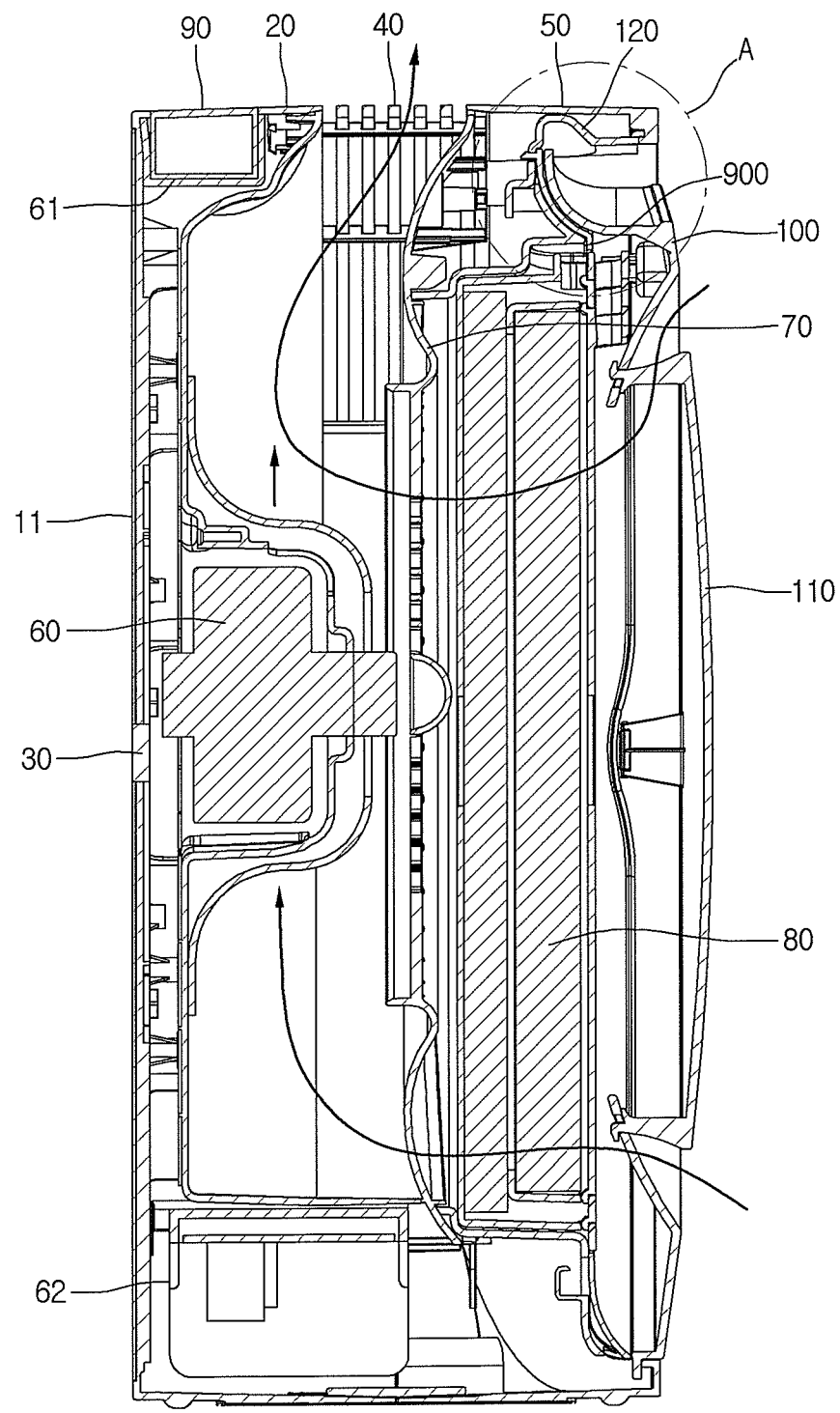
FIG. 5 is a cross-sectional view, taken along line V-V of FIG. 1.

FIG. 5 is a cross-sectional view, taken along line V-V of FIG. 1. Referring to FIG. 5, the air cleaner 10 according to an embodiment may further include a blower fan assembly 60 to suction in and discharge indoor air, a filter assembly 80 to purify the air suctioned by the blower fan assembly 60, a keypad assembly 61 mounted in an upper portion of an inside of the front case 20, a main control box 62 mounted in a lower portion of the inside of the front case 20, an air guide 70 mounted between the middle case 40 and the rear case 50, and a handle 120 inserted into an upper portion of the rear case 50.

The indoor air suctioned in through the air suction hole 102 defined between the cover panel 110 and the rear panel 100 may be purified while passing through the filter assembly 80. Then, the purified indoor air may be guided by the air guide 70 and discharged into the indoor space through a discharge grille 401, which will be described hereinbelow, disposed on the middle case 40.

Hereinafter, additional components of the air cleaner 10 will be described in detail with reference to the accompanying drawings.

Figure 6:
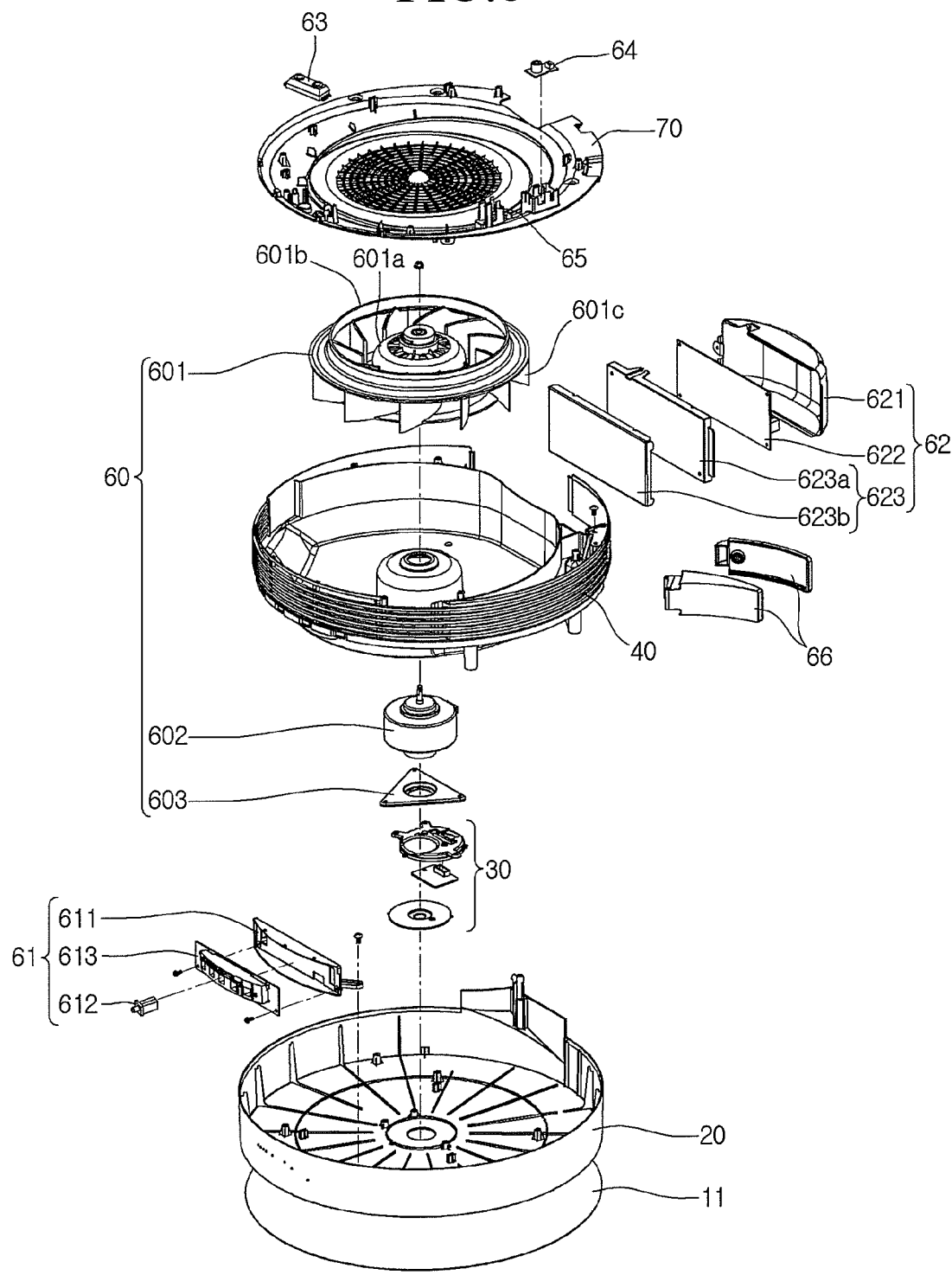
FIG. 6 is an exploded perspective view illustrating a front structure of the air cleaner.

FIG. 6 is an exploded perspective view illustrating a front structure of the air cleaner of FIG. 1. The air cleaner 10 according to embodiments may be largely divided into a front structure, and a rear structure coupled to a rear portion of the front structure.

Referring to FIG. 6, the front structure of the air cleaner 10 may include the front panel 11, the front case 20, the cleanliness display module 30 mounted on the front case 20, the middle case 40, the air guide 70, the keypad assembly 61, the blower fan assembly 60, and the main control box 62 from a front side thereof. The keypad assembly 61 may be mounted above the front case 20, that is, directly under a surface on which the control panel 90 may be disposed. The keypad assembly 61 may include a keypad case 611, a keypad PCB 613 seated on a top surface of the keypad case 611, and a button cap 612 mounted on the keypad PCB 613.

The keypad case 611 may include a bottom, on which the keypad PCB 613 may be seated, and an extension that convexly extends from each of edges of front and rear surfaces of the bottom. A top surface of the extension may be closely attached to an inner surface of the front case 20.

Buttons disposed on the control panel 90 may be capacitive type buttons. When the buttons are touched, the button cap 612 may detect a variation in capacitance to determine whether an operation command is input. When the button cap 612 is adjusted in sensitivity, the button cap 612 may detect the variation in capacitance even though the button cap 612 does not directly contact the buttons. Alternatively, a mechanical button to detect a command input only when a user pushes the button at a preset or predetermined pressure or more may be applied to the keypad assembly 61.

The blower fan assembly 60 may include a blower fan 601, a fan motor 602 to drive the blower fan 601, and a motor mount 603 to fix the fan motor 602 to the middle case 40. The blower fan 601 may be a turbo fan including a hub 601a, a plurality of blades 601c that radially extend from an outer circumferential surface of the hub 601a, and a bellmouth 601b placed on top surfaces of the plurality of blades 601c.

The main control box 62 may be disposed under the middle case 40 and include a box body 621, a main PCB 622 seated inside the box body 621, and a box cover 623 to cover the main PCB 622 to protect the main PCB 622. The box cover 623 may include an inner cover 623a and an outer cover 623b. Each of the box body 621 and the box cover 623 may be formed of a metal material to prevent flames from leaking outside even though the flames occur on the main PCB 622, thereby extinguishing the flames.

An odor sensor 64 to detect a volatile gas contained in air may be mounted on a first side of an edge of a rear surface of the air guide 70, and an anion generator 63 may be mounted on a second side. A pollution level may be determined by a value detected by the odor sensor 64. An air flow rate and a lamp color of the cleanliness display module 30 may be determined according to the determined pollution level of the indoor air.

A rear case separation detection switch 65 may be mounted on the second side of the air guide 70 to detect separation of the rear case 50. When the separation of the rear case 50 is detected, an operation of the blower fan assembly 60 may be stopped.

Figure 7:
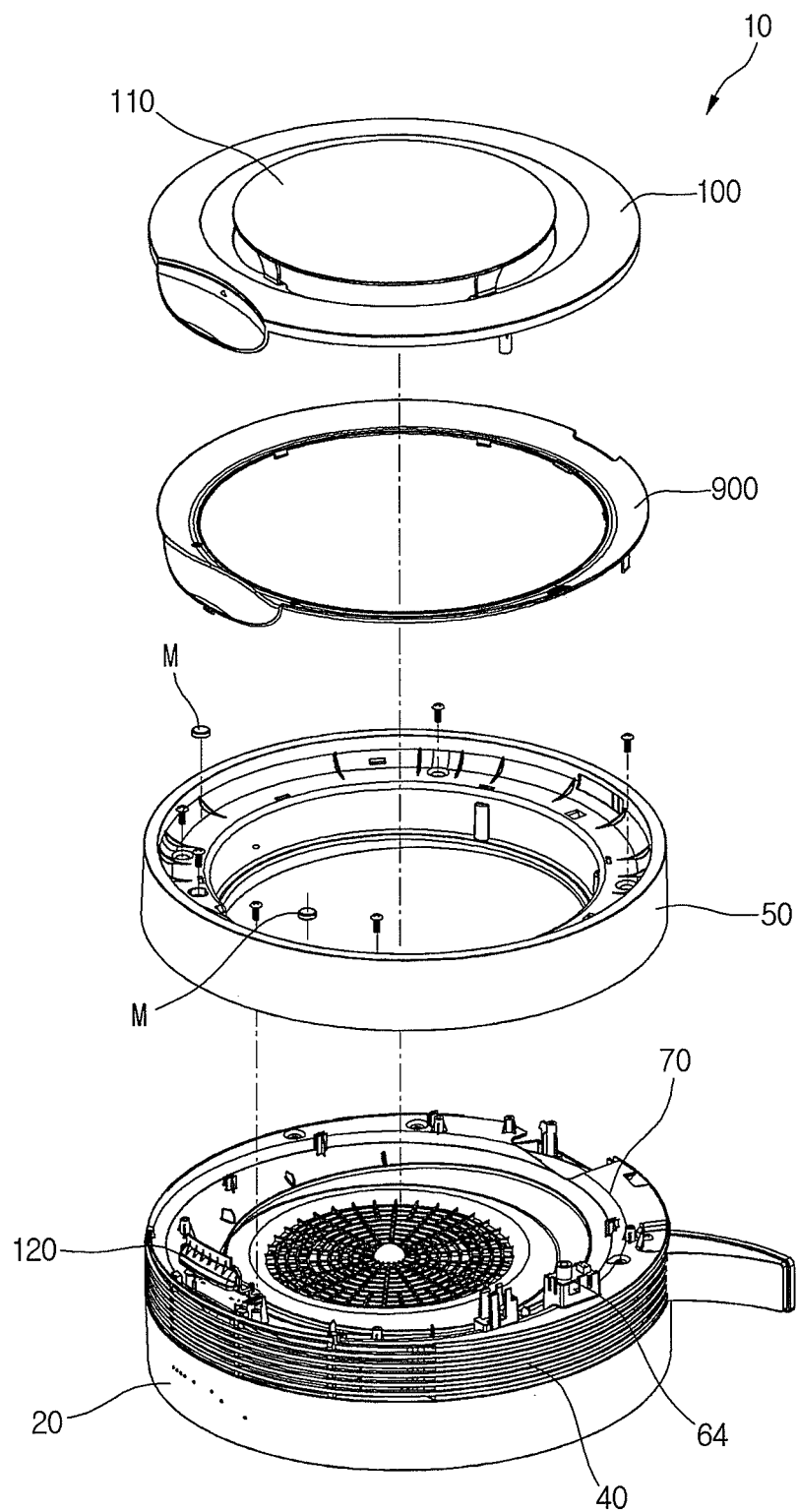
FIG. 7 is an exploded perspective view illustrating a rear structure of the air cleaner.

FIG. 7 is an exploded perspective view illustrating a rear structure of the air cleaner of FIG. 1. Referring to FIG. 7, the air cleaner 10 according to embodiments may include the front structure formed by the components described with reference to FIG. 6, the rear case 50 coupled to a rear portion of the front structure, the handle 120 coupled to an upper portion of the rear case 50, the rear cover 900 coupled to a rear portion of the rear case 50, the rear panel 100 coupled to a rear portion of the rear cover 900, and the cover panel 110 fixed to the rear panel 100.

The rear case 50 may be fixed to a rear surface of the air guide 70, and a magnet M may be mounted on each of both sides of a rear surface of the rear case 50. The rear cover 900 and the rear panel 100 may be coupled to each other using, for example, a coupling member, such as a screw. More particularly, the screw may pass through the rear cover 900 and then be coupled to the rear panel 100. A head of the screw coupling the rear cover 900 to the rear panel 100 may be attached to the magnet M using a magnetic force to couple the rear cover 900 to the rear case 50. That is, the coupling member including the screw may be formed of a magnetic material, and thus, be coupled to the magnet M.

The cover panel 110 may be coupled to the rear panel 100 in a state in which the cover panel 110 is spaced a predetermined distance from the rear panel 100. Thus, the indoor air may be suctioned through a space between the rear panel 100 and the cover panel 110.

Figure 8:
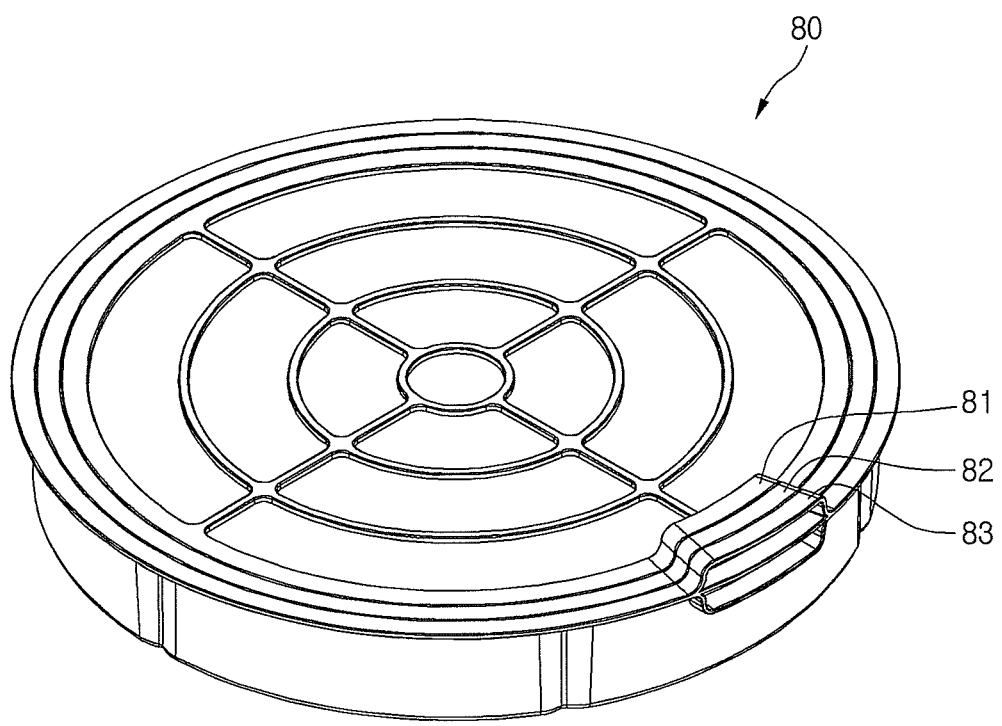
FIG. 8 is a perspective view of a filter assembly mounted in the air cleaner of FIG. 1.
Figure 9:
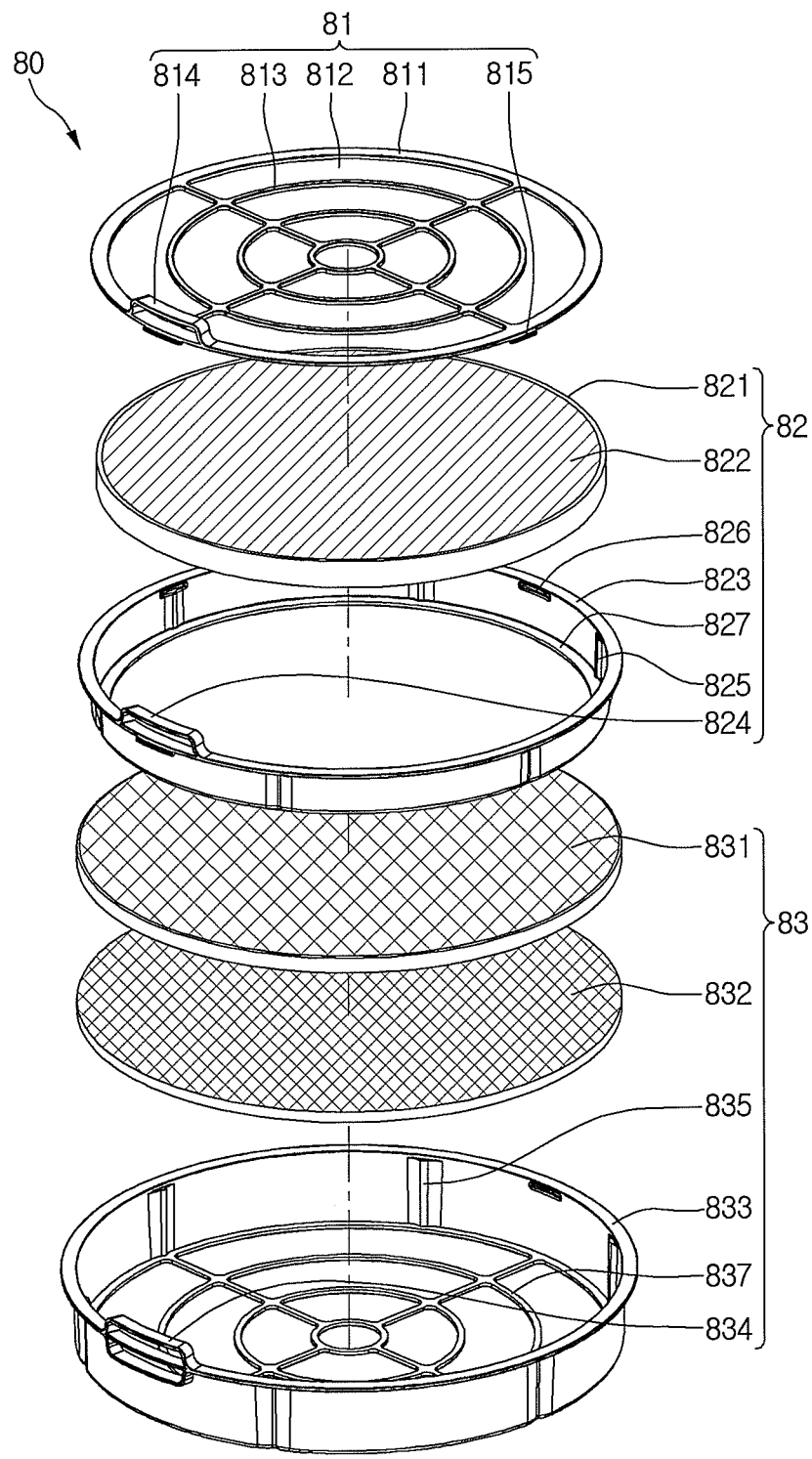
FIG. 9 is an exploded perspective view of the filter assembly of FIG. 8.

FIG. 8 is a perspective view of a filter assembly mounted in the air cleaner of FIG. 1. FIG. 9 is an exploded perspective view of the filter assembly of FIG. 8.

Referring to FIGS. 8 and 9, the filter assembly 80 according to an embodiment may have a circular shape to correspond to a circular shape of the air cleaner 10 in general. The filter assembly 80 may include a first filter 81 disposed in or at an innermost side thereof, a second filter 82 having an outer diameter greater than an outer diameter of the first filter 82 to surround the first filter 82, and a third filter 83 having an outer diameter greater than an outer diameter of the second filter 82 to surround the second filter 82.

The second filter 82 may be seated on a front surface of the third filter 83 inside the third filter 83, and the first filter 81 may be seated on a front surface of the second filter 82 inside the second filter 82. Front circumferences of the first to third filters 81, 82, and 83 may be flush with each other. Also, the first to third filters 81, 82, and 83 may include filter frames having colors different from each other, so that the filters 81, 82, and 83 may be easily distinguished from each other. In addition, the first to third filters 81, 82, and 83 may be modularized so that the first to third filters 81, 82, and 83 may be attached or detached one at a time.

The first filter 81 may include a filter frame 811 having a circular shape, a support rib 813 disposed inside the filter frame 811, and a superfine filter 812 attached to rear surfaces of the filter frame 811 and the support rib 813 to filter foreign substances. A plurality of coupling protrusions 815 may protrude from an edge of the filter frame 811. According to one embodiment, four coupling protrusions 815 may protrude at an angle of about 90° in a circumferential direction of the filter frame 811. However, embodiments are not limited to the number of coupling protrusions 815. A grasp 814 may protrude from a front edge of the filter frame 811, and a grasp groove, in which a user's hand may be inserted, may be defined in the grasp 814.

The superfine filter 812 may be a filter to remove dust particles having a relatively large size. The superfine filter 812 may extend a life span of the second filter 82 disposed at a rear side thereof.

The second filter 82 may include a ring-shaped filter cover 823 having open front and rear surfaces, and a filter member accommodated in the filter cover 823. The filter member may include a high efficiency particulate arresting (HEPA) filter 822 to filter superfine dust, and a circular filter frame 821 disposed around an outer circumferential surface of the HEPA filter 822. The HEPA filter 822 may filter yellow dust and dust particles having a size of about 0.002 micrometer, which may be less than by about 125 times than a superfine dust particle having a size of about 2.5 micrometer or less. For example, the HEPA filter 822 may filter dead body ticks, pollen, cigarette smoke particles, fine dust, motes, and animal hairs, for example, and have a strong anti-bacterial effect against germs contained in the indoor air.

The filter cover 823 may have a length corresponding to a thickness of the HEPA filter 822. A coupling hole 826, into which the coupling protrusion 815 of the first filter 81 may be inserted, may be defined in a circumferential surface of the filter cover 823. A grasp 824 may protrude from an edge of the filter cover 823 and be disposed outside the grasp 814 of the first filter 81.

One or more fixing protrusion 825 that protrudes inward may be disposed on or in the circumferential surface of the filter cover 823. The fixing protrusion 825 may be provided as a separate member, and then, may be attached to the circumferential surface of the filter cover 823. Alternatively, the fixing protrusion 825 may be formed by a forming process such that the fixing protrusion 825 protrudes inward from the circumferential surface of the filter cover 823. When the HEPA filter 822 is inserted into the filter cover 823, a phenomenon in which the HEPA filter 322 idles or vibrates may be minimized by the fixing protrusion 825. A filter seat rib 827 may extend from an edge of a front surface of the filter cover 823 in a central direction to prevent the HEPA filter 822 from being separated from the filter cover 823 in a state in which the HEPA filter 822 is seated on the filter cover 823.

The third filter 83 may include a filter case 833 and two deodorization filters seated on the filter case 833. The two deodorization filters may include a first deodorization filter 831, and a second deodorization filter 832. The deodorization filters may filter cigarette smoke, formaldehyde that acts as an induction substance of sick house syndrome, toluene, and benzene, for example. More particularly, the first deodorization filter 831 may filter ammonia, and acetaldehyde, for example, and the second deodorization filter 832 may filter acetic acid components. It is seen by testing that the deodorization filters 831 and 832 achieve deodorization efficiency of about 98%.

The filter case 833 may have an inner diameter capable of accommodating the filter cover 823. A support rib 837 may be disposed on a front surface of the filter case 833 to prevent the deodorization filters 831 and 832 from being separated. The support rib 837 may have a same shape as the support rib 813 of the first filter 81. One or more fixing protrusion 835, each of which may have a same shape and function as the fixing protrusion 825 disposed on or in the circumferential surface of the filter cover 823, may be disposed on the filter case 833. Also, when the second filter 82 is seated on the filter case 833, a protruding portion of the fixing protrusion 835 may be inserted into a recessed outer portion of the fixing protrusion 825 to prevent the second filter 82 from idling or vibrating within the filter case 833. A grasp 834 may protrude from an edge of the filter case 834 and be disposed outside the grasp 824 of the second filter 82.

In the above-described structure, the suctioned indoor air may be purified while successively passing through the first filter 81, the second filter 82, and the third filter 83, and then, may be discharged into the indoor space by the blower fan.

Figure 10:
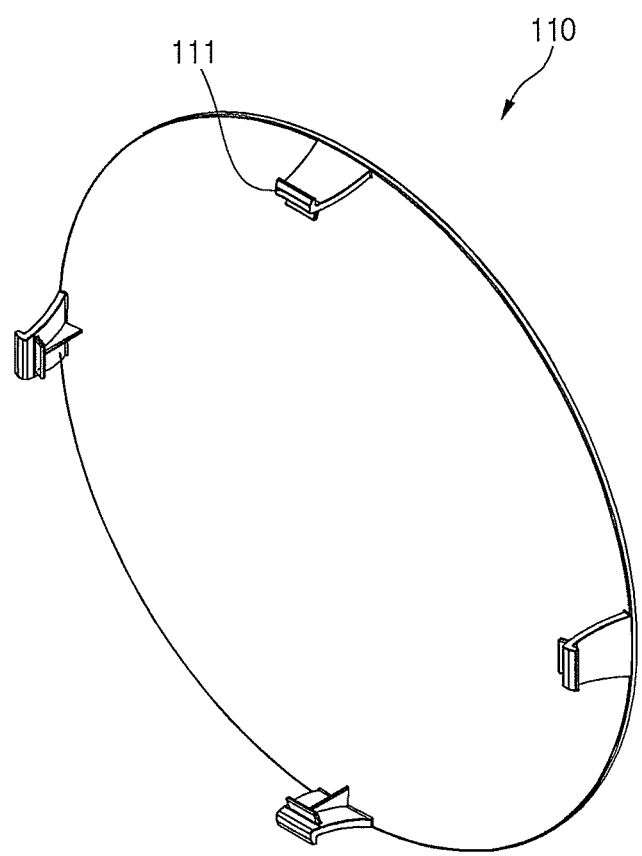
FIG. 10 is a front perspective view of a cover panel of the air cleaner of FIG. 1.

FIG. 10 is a front perspective view of a cover panel of the air cleaner of FIG. 1. Referring to FIG. 10, the cover panel 110 may be coupled to a rearmost side of the air cleaner 10. A surface facing a front side of the air cleaner 10 may be defined as a front surface, and an opposite surface may be defined as a rear surface.

A plurality of coupling hooks 111 may protrude forward from an edge of the front surface of the cover panel 110. For example, four coupling hooks 111 may be provided, as illustrated in FIG. 10, according to a design preference. Alternatively, more of less coupling hooks 111 may be provided.

The cover panel 110 may be disposed on the rear surface of the air cleaner 10 to cover the air suction hole (see reference numeral 102 of FIG. 11) defined in the rear cover 100. More particularly, the cover panel 110 may prevent an accident, in which a portion of a body of a children or pet is inserted into the air suction hole 102, from occurring, and may also prevent the air suction hole 102 from being blocked by an object having a relatively large volume, such as a towel. Also, as the cover panel 110 is coupled to the rear cover 100, the air suction hole 102 having a circular ring shape may be exposed to or at the rear surface of the air cleaner 10.

Figure 11:
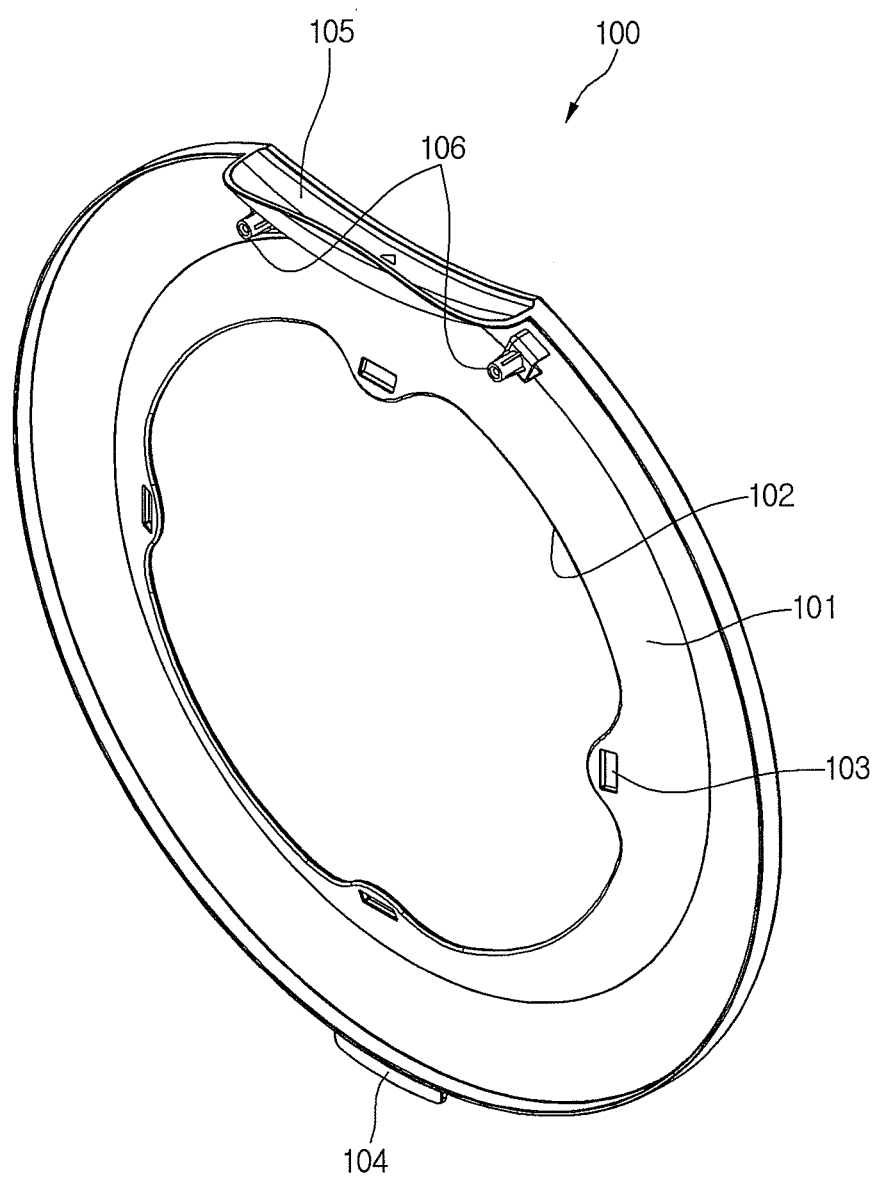
FIG. 11 is a front perspective view of a rear panel of the air cleaner of FIG. 1.
Figure 12:
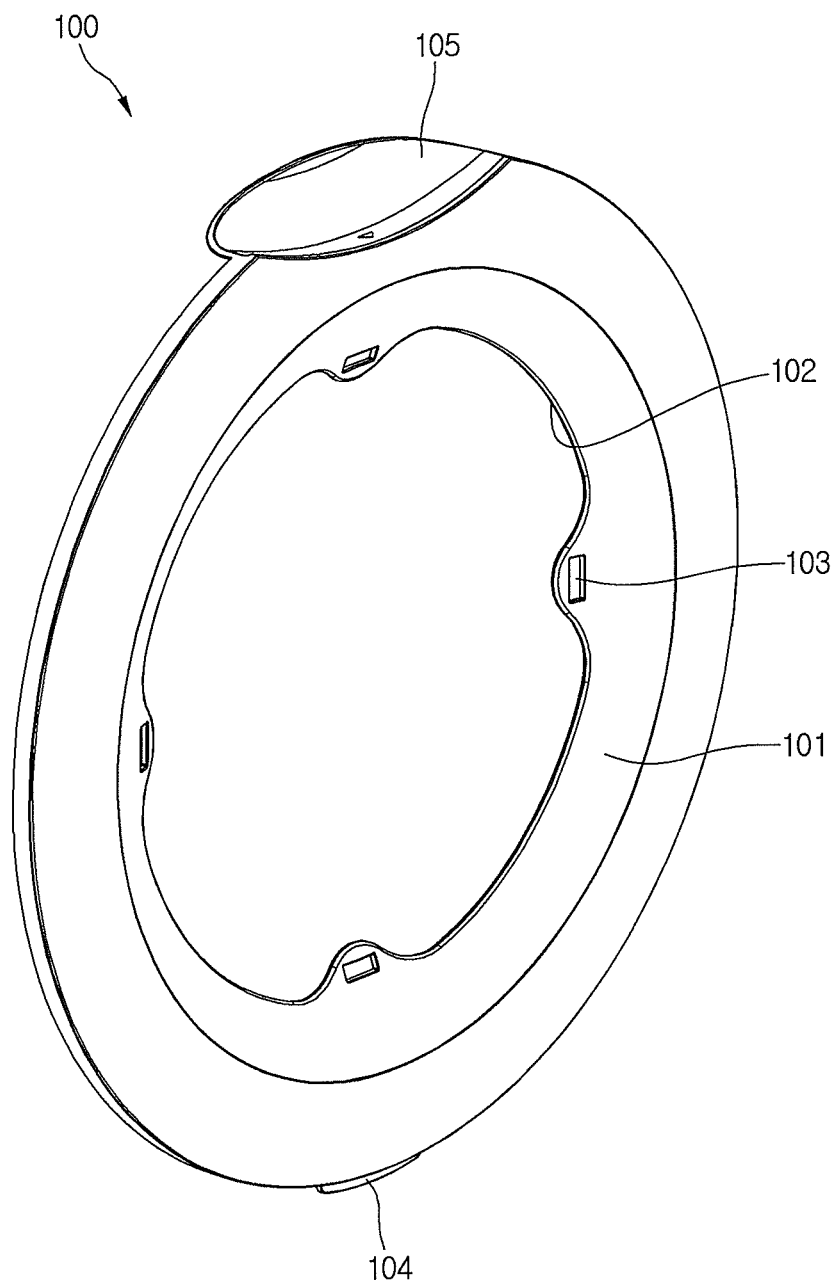
FIG. 12 is a rear perspective view of the rear panel of FIG. 11.

FIG. 11 is a front perspective view of a rear panel of the air cleaner of FIG. 1. FIG. 12 is a rear perspective view of the rear panel of FIG. 11.

Referring to FIGS. 11 and 12, the rear panel 100 may be coupled to a rear portion of the air cleaner 10 to guide introduction of the indoor air. An air guide surface 101, which may be concavely rounded forward, may be disposed on or at a position spaced a predetermined distance inward from an edge of the rear panel 100, and the air suction hole 102 may be defined inside the air guide surface 101. The air suction hole 102 may be defined inside the air guide surface 101, and a plurality of hook holes 103 may be defined in or at an inner edge of the air guide surface 101. The plurality of coupling hooks 111 of the cover panel 110 may be inserted into the plurality of hook holes 103, respectively.

A grasp guide 105 may be disposed at an outer edge of a top surface of the rear panel 100. The grasp guide 105 may extend forward from the edge of the rear panel 100 to extend at an incline upward, and then may be smoothly rounded. The grasp guide 105 may be a guide surface to guide a user's hand to the handle 120 of the air cleaner 10.

A coupling rib 104 may protrude from the outer edge of a lower surface of the rear panel 100. The coupling rib 104 may be configured to fix a lower end of the rear panel 100 to a lower end of the rear case 50.

One or more magnetic coupling member 106, such as a screw, may be coupled to an upper portion of the front surface of the rear panel 100, that is, in a vicinity of the grasp guide 105. The coupling member 106 may pass through the rear cover 900 disposed at a front side of the rear panel 100, and then, may be inserted into the front surface of the rear panel 100. A head of the coupling member 106 may be attached by the magnetic force of the above-described magnet M.

Figure 13:
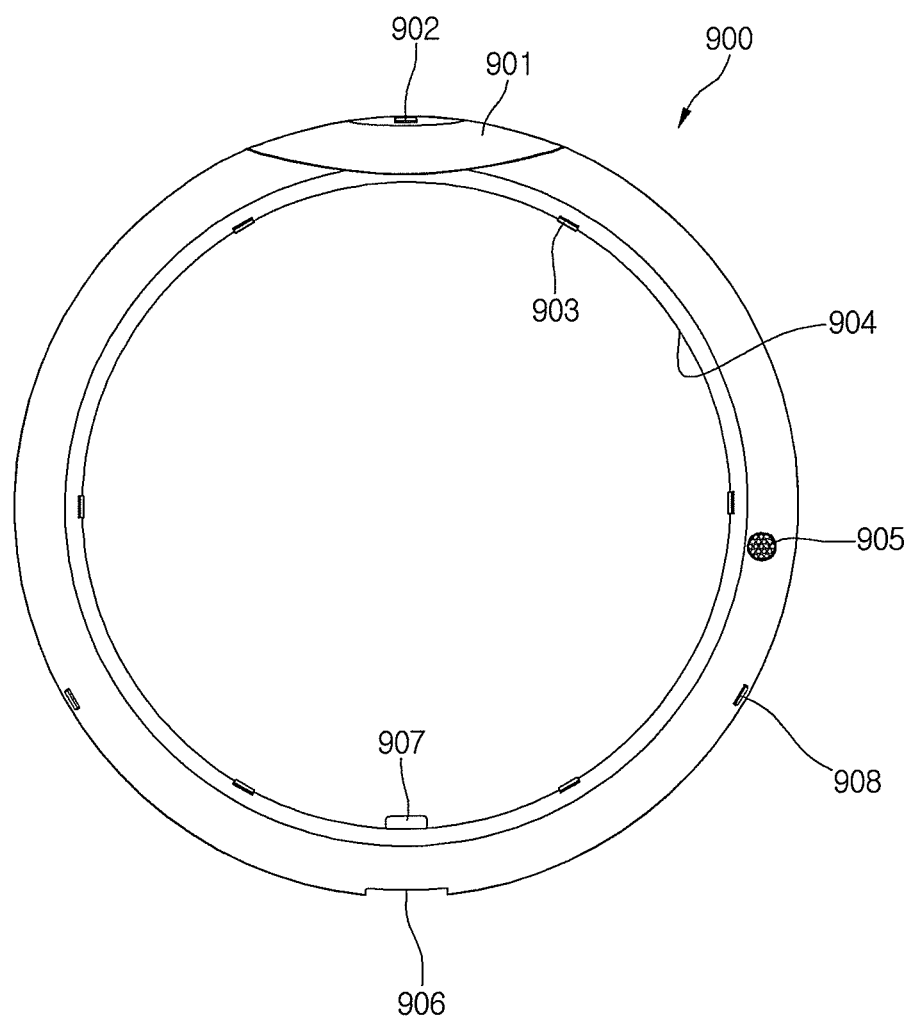
FIG. 13 is a front perspective view of a rear cover of the air cleaner of FIG. 1.
Figure 14:
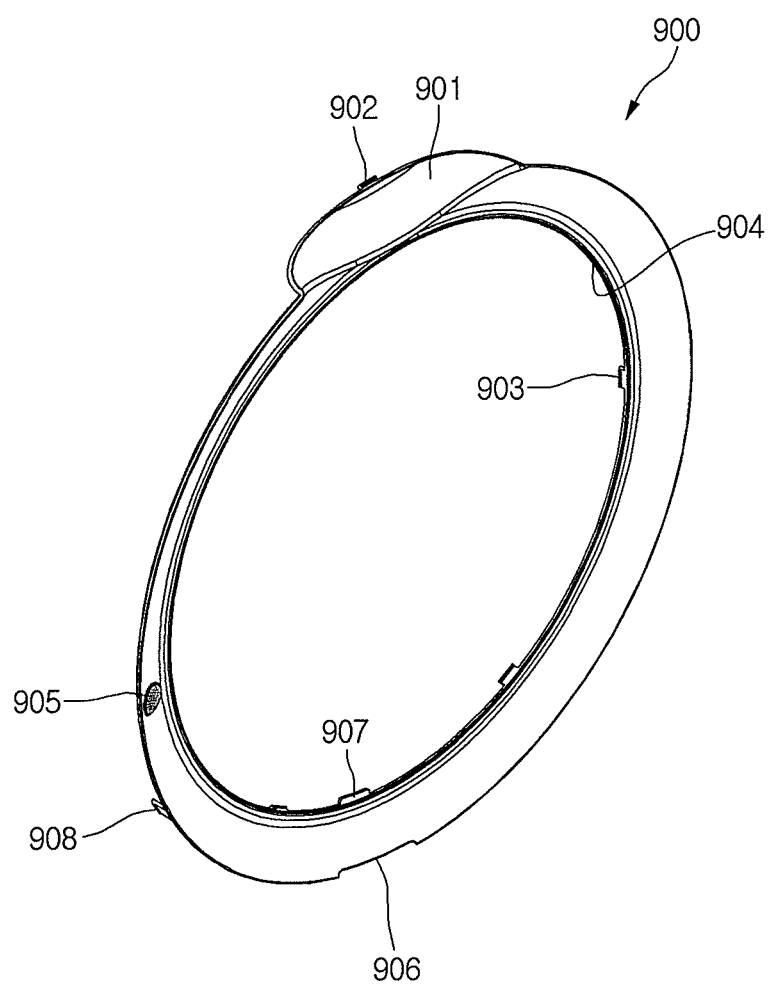
FIG. 14 is a rear perspective view of the rear cover of FIG. 13.

FIG. 13 is a front perspective view of a rear cover of the air cleaner of FIG. 1. FIG. 14 is a rear perspective view of the rear cover of FIG. 13.

Referring to FIGS. 13 and 14, a grasp guide 901, which may be inclined and rounded to correspond to a shape of the grasp guide 105 of the rear panel 100, may protrude forward from an upper portion of the rear cover 900. A hollow 904 may be defined inside the rear cover 900. The hollow 904 may have a diameter corresponding to an outer diameter of the air guide surface 101 disposed on the rear panel 100.

A sensor grille 905 may be disposed on or at a side of the rear cover 900, and the odor sensor 64 may be disposed on or at a front side of the sensor grille 905. Thus, the odor sensor 64 may detect a pollution level of the indoor air using air introduced through the sensor grille 905.

A plurality of inner coupling ribs 903 may protrude from an inner edge of the rear cover 900, and at least one or a plurality of outer coupling ribs 908 may protrude from an outer edge of the rear cover 900.

A filter interference protrusion 907 may protrude from one side of an inner circumference of the rear cover 900, that is, a lower portion of the inner circumference. The filter interference protrusion 907 may protrude from an edge of a rear surface of the third filter 80 in a central direction in a state in which the filter assembly 80 is mounted on the rear case 50. Thus, it may prevent the filter assembly 80 from being separated from the rear case 50.

An evasion groove 906 may be defined in or at a lower end of the rear cover 900. The evasion groove 906 may prevent the coupling rib 104 and the lower end of the rear cover 900 from interfering with each other when the coupling rib 104 disposed on the lower end of the rear panel 100 is inserted into an insertion hole (see reference numeral 504 of FIG. 17) of the rear case 50. In detail, to couple the rear panel 100 to the rear case 50, the coupling rib 104 may be inserted into the insertion hole 504, in a state in which the rear panel 100 is in a horizontal state. Coupling member 106 may be coupled to an upper portion of the front surface of the rear panel 100, in a state in which the rear panel 100 vertically stands up, and may be closely attached to the magnet M mounted on the upper portion of the rear surface of the rear case 50. When the rear panel 100 vertically rotates in the horizontal state, the evasion groove 906 may prevent the coupling rib 104 from interfering with the lower end of the rear cover 900.

Figure 15:
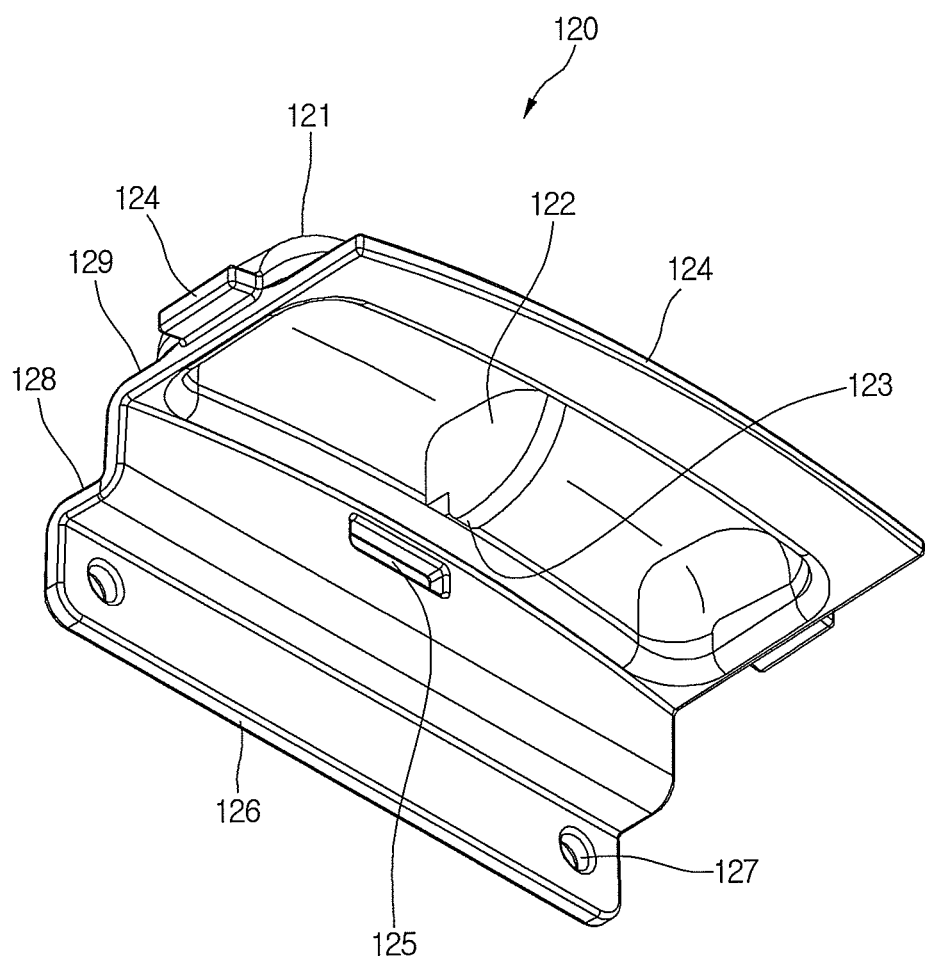
FIG. 15 is a perspective view of a handle of the air cleaner of FIG. 1, when viewed from below.
Figure 16:
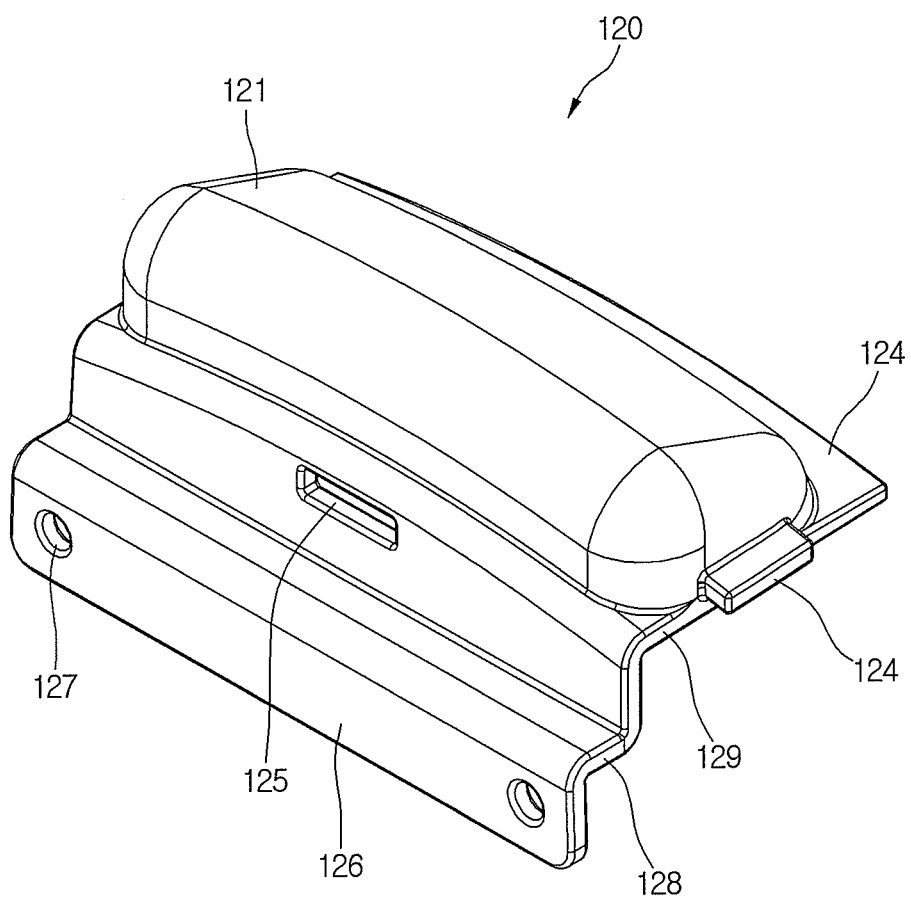
FIG. 16 is a perspective view of the handle of FIG. 15, when viewed from above.

FIG. 15 is a perspective view of a handle of the air cleaner of FIG. 1, when viewed from below. FIG. 16 is a perspective view of the handle of FIG, when viewed from above.

Referring to FIGS. 15 and 16, the handle 120 of the air cleaner 10 according to embodiments may be coupled to an upper portion of the rear case 50. In detail, the handle 120 may include a closely attaching end 126 that extends downward and may be coupled to a handle coupling boss (see reference numeral 531 of FIG. 17) that protrudes from the front surface of an upper portion of the rear case 50, a first step 128 bent backward and extending from an upper end of the closely attaching end 126, a second step 129 bent upward and extending from the first step 128 to extend and then bent again horizontally, a seating end 124 that further extends horizontally to backward and lateral sides from each of a front end and both ends of the second step 129, a grasp groove 121 recessed upward from the second step 129, and a hook rib 122 that vertically extends from a bottom surface of the grasp groove 121.

In more detail, a coupling hole 127 may be defined in an edge of each of both sides of the closely attaching end 126. A coupling member that passes through the coupling hole 127 may be inserted into the handle coupling boss (see reference numeral 531 of FIG. 17) of the rear case 50, and thus, the handle 120 may be fixed to the rear case 50.

A hook hole 125 may be defined in a vertical surface that connects the first step 128 to the second step 129. A coupling hook (see reference numeral 902 of FIG. 13) that protrudes from the grasp guide 901 of the rear cover 900 may be inserted into the hook hole 125. Thus, an upper end of the rear cover 900 may be fixed to the handle 120 by the coupling hook 902.

The hook rib 122 may extend from an approximately central portion of a bottom surface of the grasp groove 121, and a hook protrusion 123 may be disposed on a front lower end of the hook rib 122. The grasp guide 105 of the rear panel 100 may be inserted and hooked on the hook protrusion 123. Thus, an upper end of the rear panel 100 may also be fixed to the handle 120. When the rear panel 100 is assembled, the upper end of the grasp guide 105 may be press-fitted into a front side along a surface of the lower end of the hook rib 122, and then, may be hooked on the hook protrusion 123.

The air cleaner 10 may be held or transferred in a state in which the user's finger is inserted into the grasp groove 121.

Figure 17:
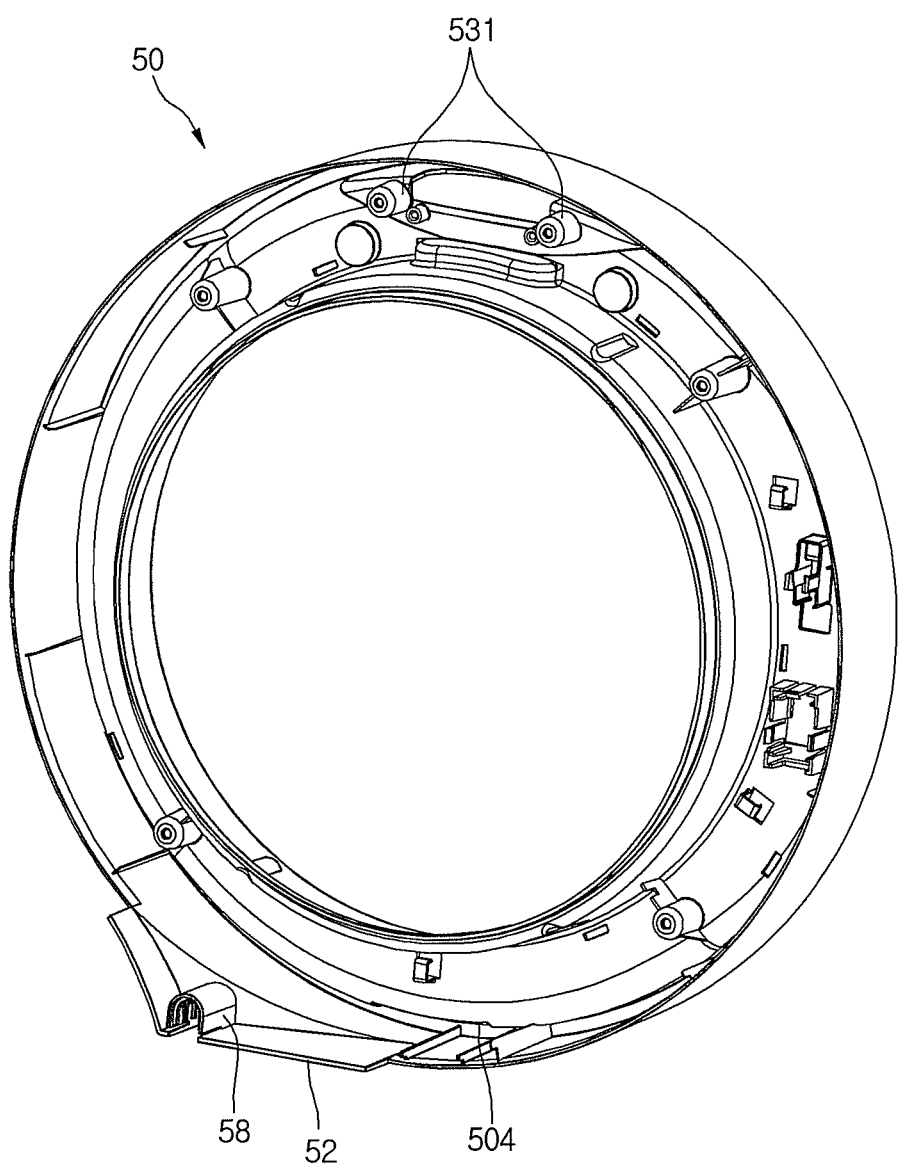
FIG. 17 is a front perspective view of a rear case of the air cleaner of FIG. 1.
Figure 18:
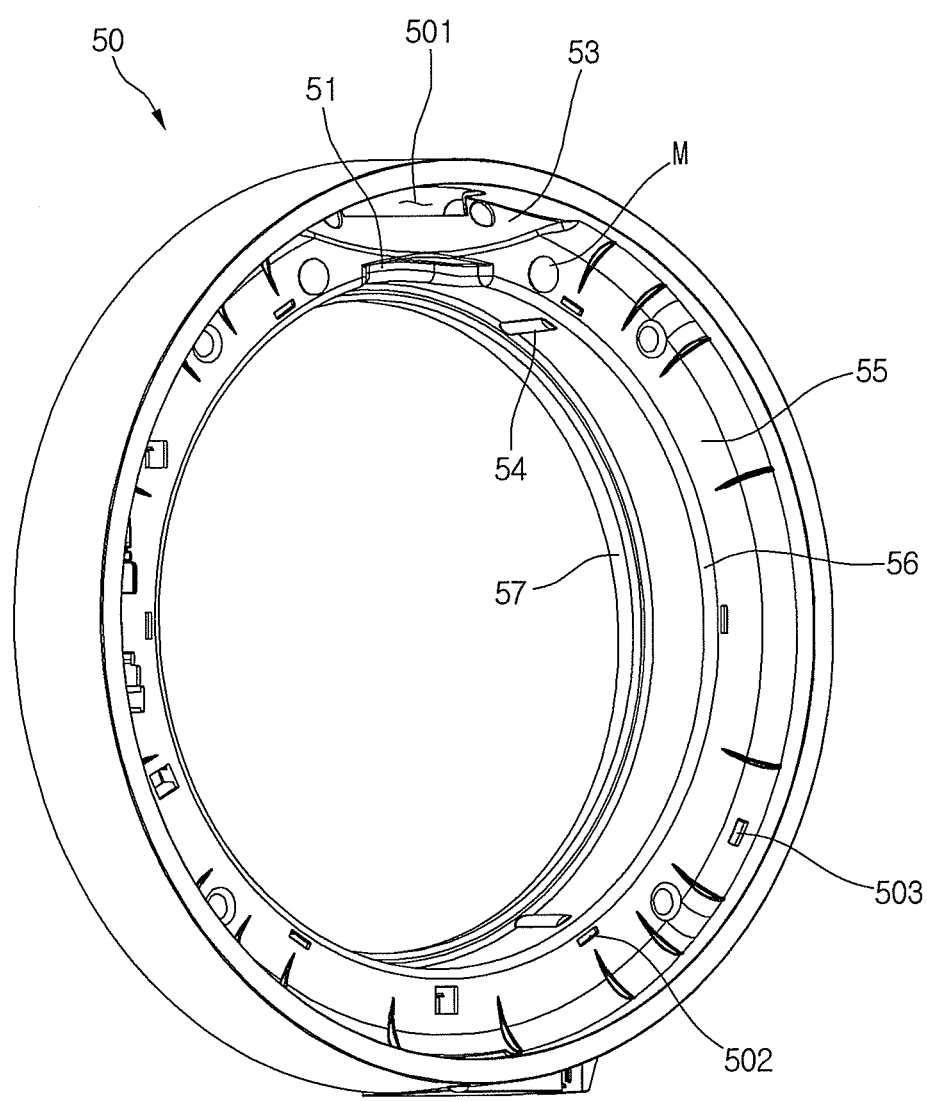
FIG. 18 is a rear perspective of the rear case of FIG. 17.

FIG. 17 is a front perspective view of a rear case of the air cleaner of FIG. 1. FIG. 18 is a rear perspective of the rear case of FIG. 17.

Referring to FIGS. 17 and 18, a pair of handle coupling bosses 531 may protrude from a front surface of the rear case 50 according to embodiments, and a coupling member that passes through the closely attaching end 126 of the handle 120 may be inserted into the pair of handle coupling bosses 531. A support 52 may be disposed on a lower end of the front surface of the rear case 50, and a wire insertion portion 58 having a tunnel shape may be roundly formed in the support 52. A power supply wire may be inserted into the wire insertion portion 58, which may be recessed upward in the tunnel shape.

Also, an insertion hole 504 may be defined in a center of a lower end of the rear case 50. The coupling rib 104 that protrudes from the lower end of the rear panel 100 may be inserted into the insertion hole 504.

A rear cover seat 55 stepped forward to allow the rear cover 900 to be seated thereon may be disposed on a rear surface of the rear case 50. A filter mount sleeve 56 may be formed at a predetermined depth inside the rear cover seat 55. The filter mount sleeve 56 may extend in a cylindrical shape forward from an inner edge of the rear cover seat 55 to define a space in which the filter assembly 80 may be inserted. A plurality of filter fixing protrusions 54 may protrude from an inner circumferential surface of the filter mount sleeve 56. When the filter assembly 80 is mounted, each of the filter fixing protrusions 54 may be inserted into the fixing protrusion 835 disposed on or in the circumferential surface of the filter case 833.

A filter seat 57 may be stepped in a vicinity of a front end of the filter mount sleeve 56. The filter seat 57 may be formed by bending the filter mount sleeve 56 in a central direction of the rear case 50. The filter case 833 of the filter assembly 80 may be disposed on the filter seat 57.

A guide groove 51 may be recessed forward from an inner edge of the rear cover seat 55. Grasps 814, 824, and 834 of the filter assembly 80 may be disposed on a portion in which the guide groove 51 is defined. Thus, when a user's finger is inserted into the grasps 814, 824, and 834 to separate the filter assembly 80, the user's finger may be guided to the grasps 814, 824, and 834 by the guide groove 51. More particularly, the guide groove 51 may communicate with the grasp groove of the grasp 834 disposed on the front edge of the filter case 833.

A guide surface 53 may be inclined upward above the guide groove 51. A through hole 501 may be defined in a front end of the guide surface 53. The user's finger may approach the grasp groove 121 of the handle 120 through the through hole 501.

The magnet M may be mounted on the rear cover seat 55. A head of the coupling member 106 coupled to the front surface of the rear panel 100 may be attached to the magnet M.

A plurality of inner coupling holes 502 may be defined in an inner edge of the rear cover seat 55, and an outer coupling hole 503 may be defined in an outer edge of the rear cover seat 55. The inner coupling rib 903 of the rear cover 900 may be inserted into the inner coupling hole 502, and the outer coupling hole 503 may be inserted into the outer coupling rib 908.

Figure 19:
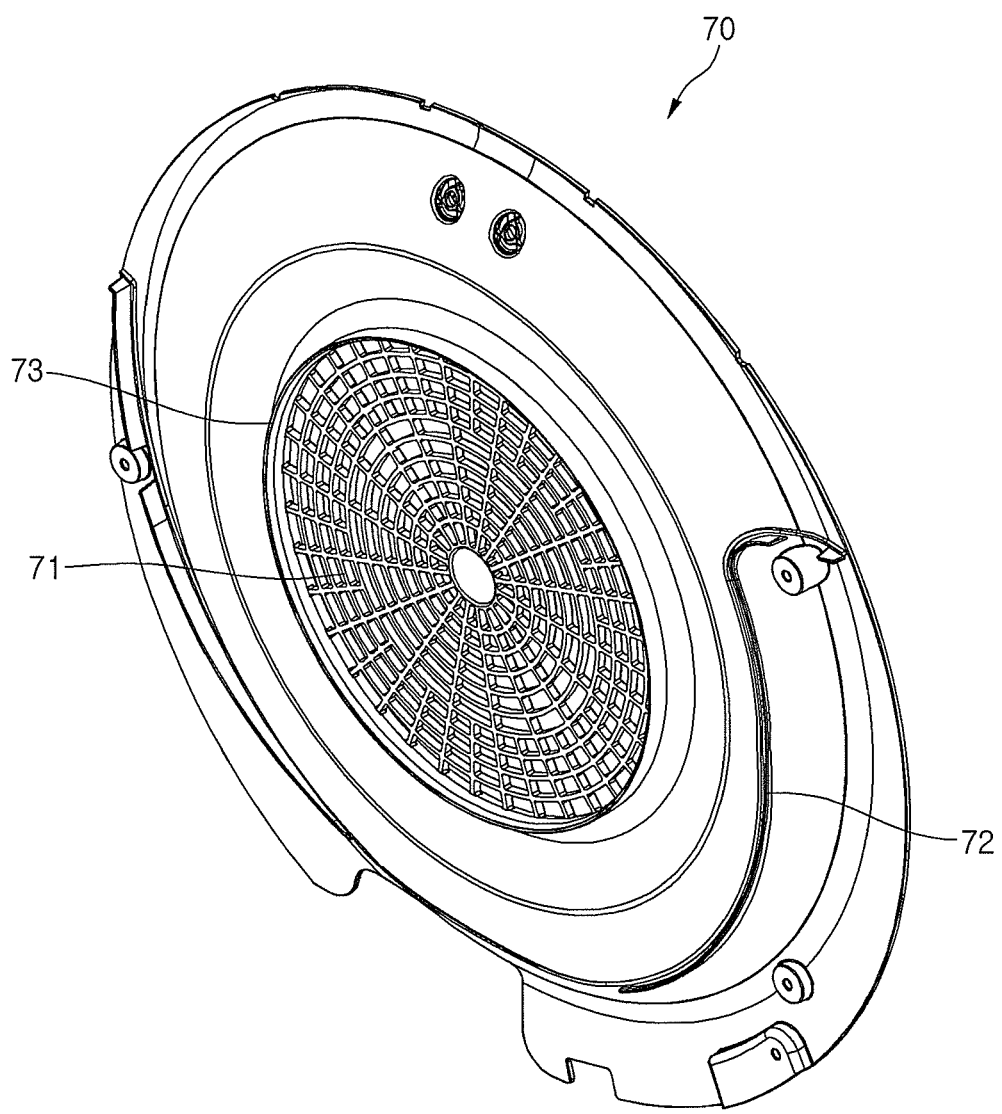
FIG. 19 is a front perspective view of an air guide of the air cleaner of FIG. 1.
Figure 20:
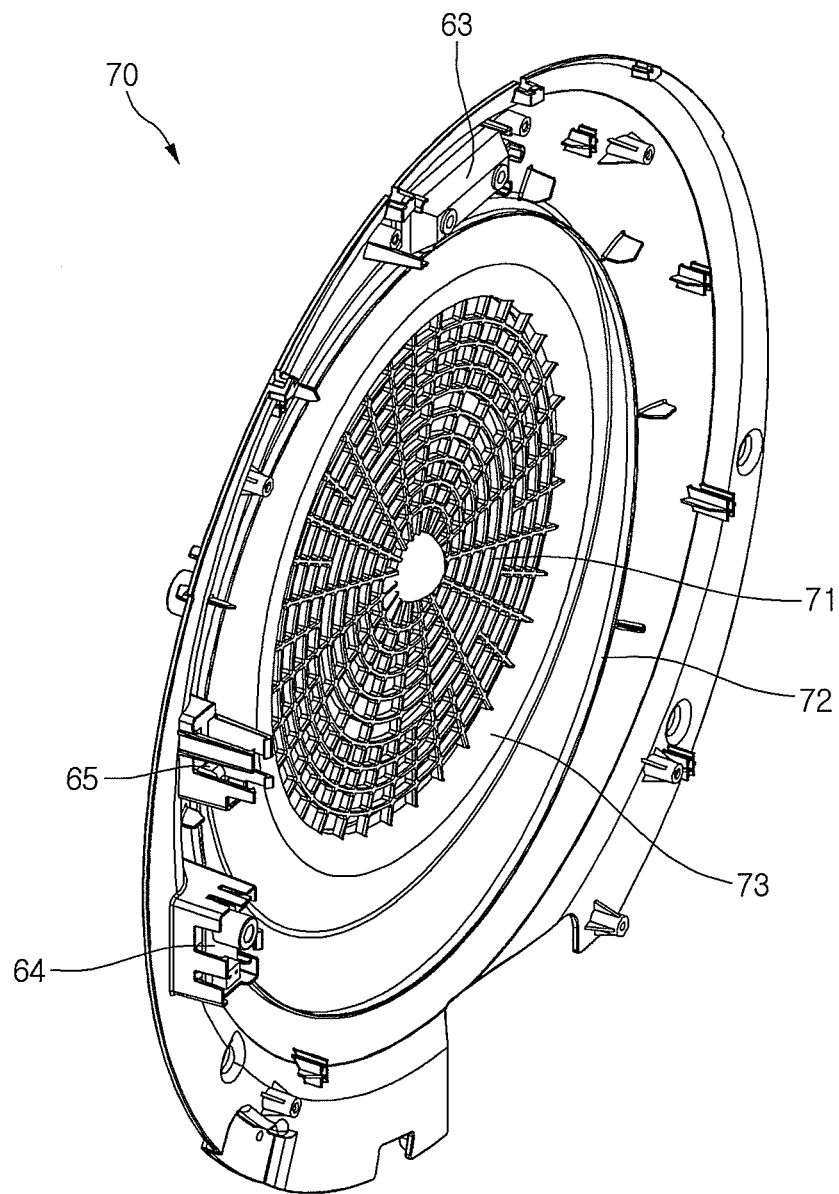
FIG. 20 is a rear perspective of the air guide of FIG. 19.

FIG. 19 is a front perspective view of an air guide of the air cleaner of FIG. 1. FIG. 20 is a rear perspective of the air guide of FIG. 19.

Referring to FIGS. 19 and 20, the air guide 70 according to embodiments may be coupled to a rear side of the middle case 40. A suction grille 71 may be disposed inside the air guide 70. The indoor air may be guided to the blower fan assembly 60 through the suction grille 71. A shroud 73 may be roundly disposed on an outer edge of the suction grille 71. The suctioned indoor air may pass through the suction grille 71, and then, may be smoothly guided to the blower fan assembly 60.

In more detail, the bellmouth 601b of the blower fan 601 may be disposed on the shroud 73. That is, the shroud 73 may extend to an inside of the bellmouth 601b to guide the indoor air suctioned through the suction grille 71 into the bellmouth 601, thereby minimizing air flow rate loss. A step 72 may be disposed on a front surface of the air guide 70. A discharge guide wall (see reference numeral 41 of FIG. 22) of the middle case 40 may contact an outside of the step 72.

The rear case separation detection sensor 65, the odor sensor 64, and the anion generator 63 may be mounted on an edge of a rear surface of the air guide 70. However, embodiments are not limited to the mounted positions of the sensors.

Figure 21:
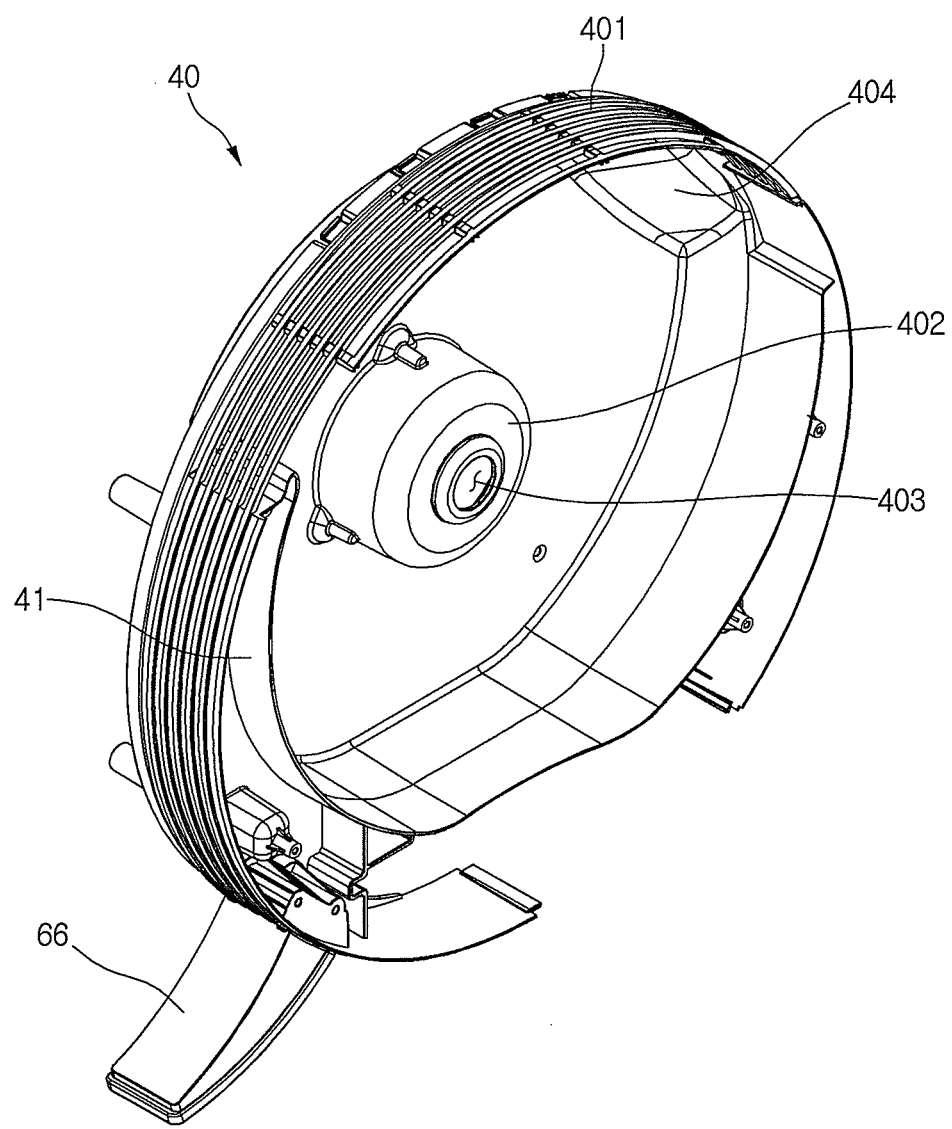
FIG. 21 is a front perspective view of a middle case of the air cleaner of FIG. 1.
Figure 22:
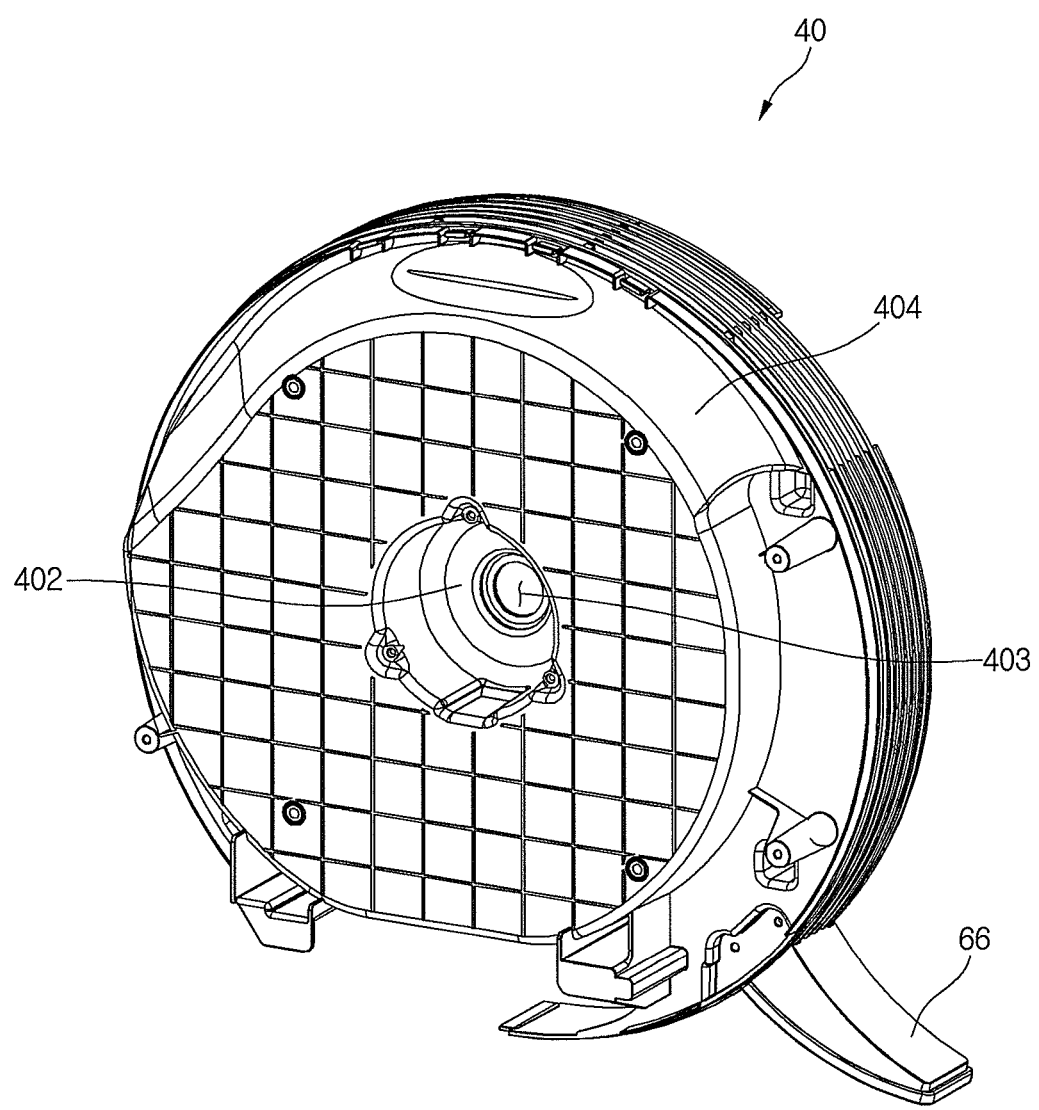
FIG. 22 is a rear perspective view of the middle case of FIG. 21.

FIG. 21 is a front perspective view of a middle case of the air cleaner of FIG. 1. FIG. 22 is a rear perspective view of the middle case of FIG. 21.

Referring to FIGS. 21 and 22, the middle case 40 according to embodiments may guide the indoor air suctioned by the blower fan assembly 60 so that the indoor air is discharged again into the indoor space. In detail, a motor seat 402, in which the fan motor 602 may be accommodated, may protrude backward at an approximately central portion of the middle case 40. A motor shaft through hole 403 may be defined in a rear surface of the motor seat 402. The motor seat 402 may have a size and shape that correspond to those of the fan motor 602.

The middle case 40 may have a side surface having a cylindrical shape. A discharge grille 401 may be disposed in an upper portion of the middle case 40.

A discharge guide wall 41 to guide the air discharged in a radial direction of the blower fan 601 to the discharge grille 401 may be disposed on or at an edge of the rear surface of the middle case 40. The discharge guide wall 41 may be rounded along blades 601c of the blower fan 601.

An inclined surface 404 may be provided on or at a side surface of the middle case 40, which corresponds to a side at which the discharge grille 401 may be disposed. Thus, the air guided to the discharge grille 401 may be minimized in flow resistance by the inclined surface 404.

The leg 66 may be fixedly, rotatably, or separably coupled to a lower portion of the side surface of the middle case 40.

Figure 23:
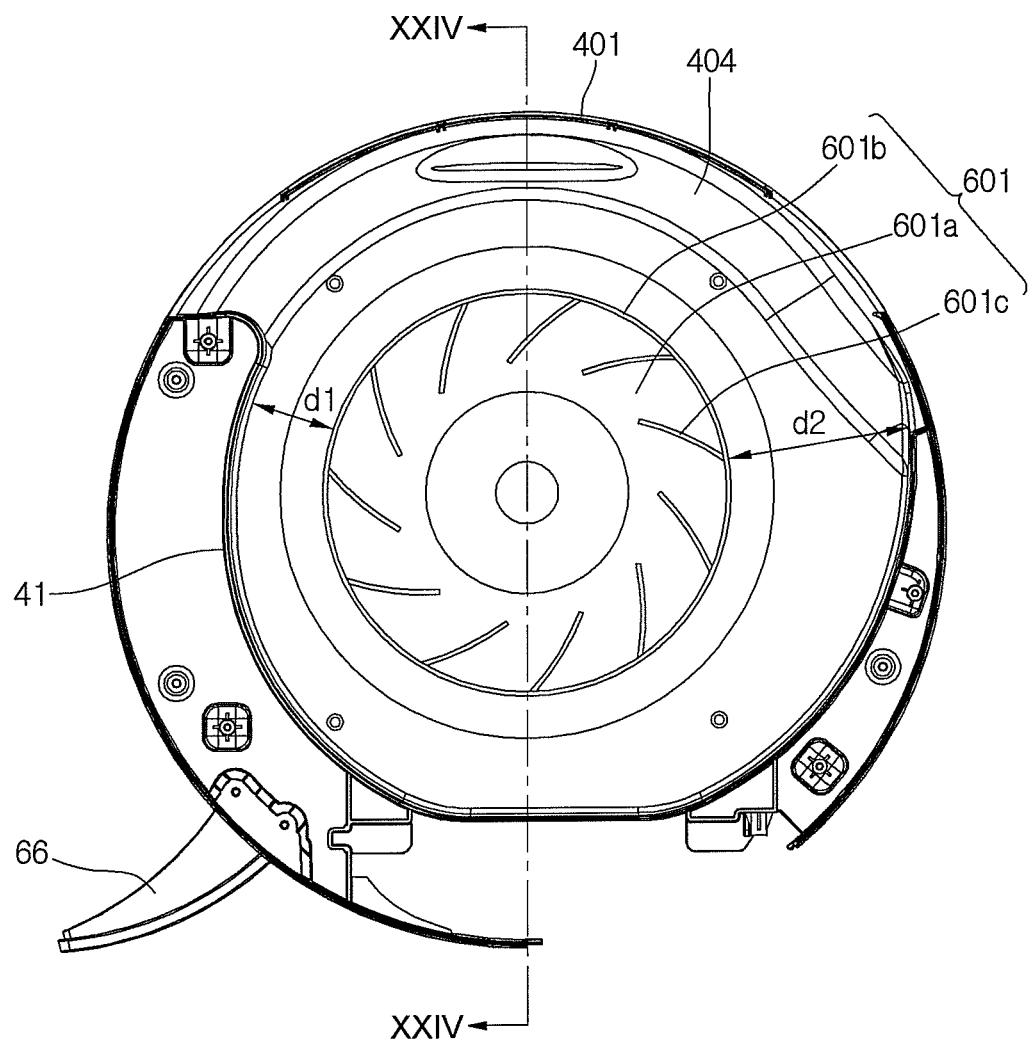
FIG. 23 is a view illustrating a state in which a blower fan is mounted on a rear surface of the middle case of FIG. 21.
Figure 24:
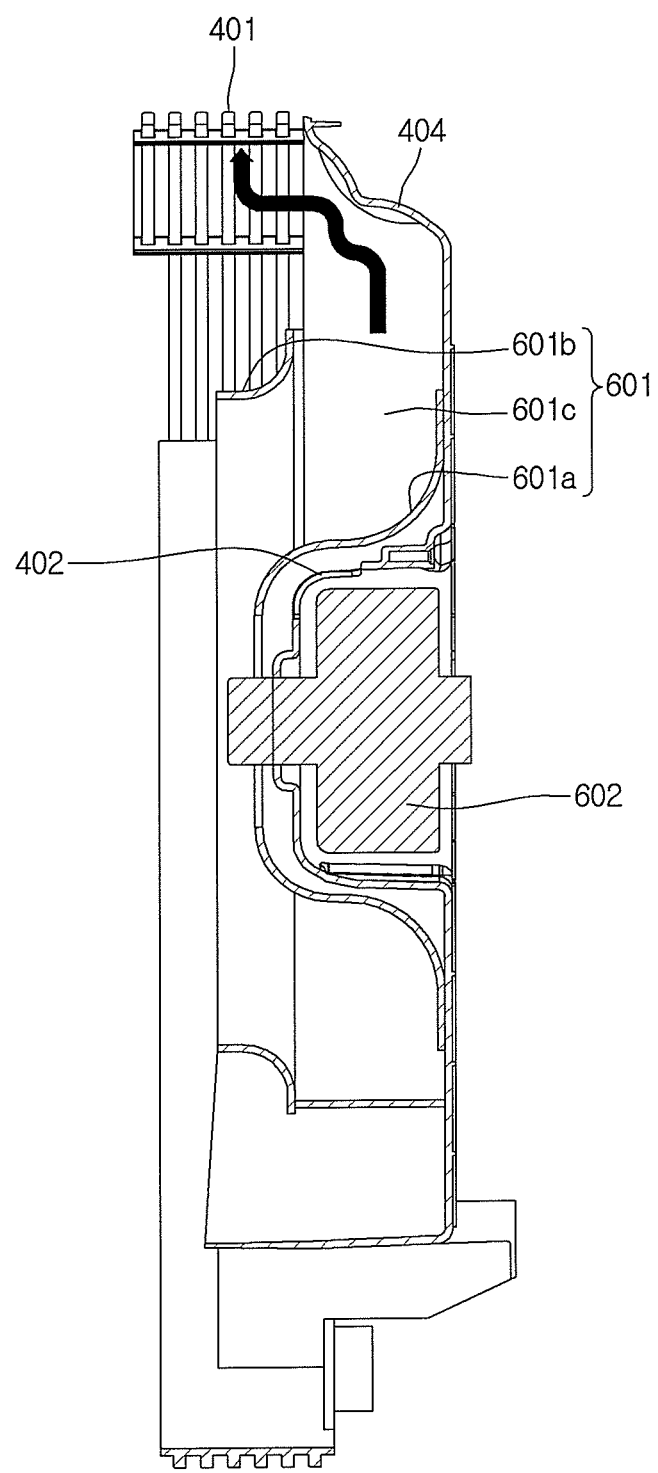
FIG. 24 is a cross-sectional view, taken along line XXIV-XXIV of FIG. 23.

FIG. 23 is a view illustrating a state in which a blower fan is mounted on a rear surface of the middle case. FIG. 24 is a cross-sectional view, taken along line XXIV-XXIV of FIG. 23.

Referring to FIGS. 23 and 24, as described above, the indoor air suctioned in an axial direction by the blower fan 601 may be discharged in a radial direction by the blades 601c. Then, the air discharged in the radial direction may rotate along the discharge guide wall 41 and then be discharged into the indoor space through the discharge grille 401. The air guided to the discharge grille 401 may flow along the inclined surface 404 and then be discharged with low flow resistance.

A predetermined distance may be provided between an end of the blades 601c of the blower fan 601 and the discharge guide wall 41. The blower fan 601 may be a turbo fan that rotates in a clockwise direction in the drawings. A portion at which rotation of the air radially separated from the blower fan 601 starts may have a width d1 less than a width d2 of a portion at which the rotation of the air ends. That is, an air passage twisted around the blower fan may have a width that gradually increases from a starting point to an ending point of the rotation of the air. As described above, when a flow area of the air discharged from the blower fan 601 gradually increases, the air may decrease in pressure and increase in flow speed based on the Bernoulli principle.

Figure 25:
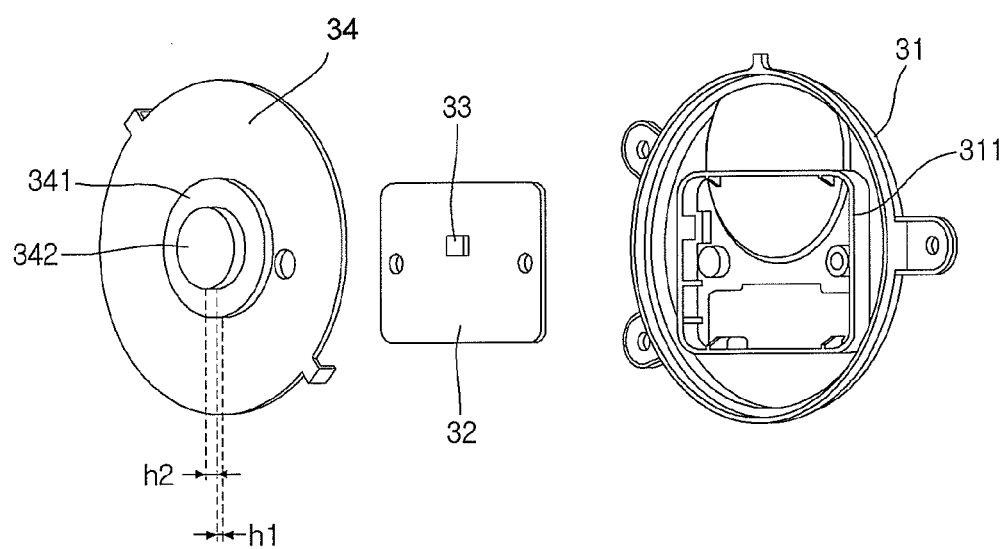
FIG. 25 is a perspective view of a cleanliness display module mounted on the air cleaner of FIG. 1.

FIG. 25 is a perspective view of a cleanliness display module mounted on the air cleaner of FIG. 1. Referring to FIG. 25, the cleanliness display module 30 according to embodiments may be mounted on the front case 20 of the air cleaner 10. The cleanliness display module 30 may emit light having colors different from each other according to cleanliness of the indoor air. Thus, a user may easily recognize the cleanliness of the indoor air.

In detail, the cleanliness display module 30 may include a module case 31, a sub PCB 32 seated on the module case 31, a light emitting device 33 mounted on a front surface of the sub PCB 32, and a module cover 34 that covers the module case 31. In more detail, a PCB seat rib 311, on which the sub PCB 32 may be seated may protrude from inside of the module case 31. The PCB seat rib 311 may surround an edge of the sub PCB 32 to prevent the sub PCB 32 from being shaken within the module case 31.

The light emitting device 33 may include an LED that changes in color according to a resistance value of supplied power. That is, if a pollution level is high, the LED may emit red light. On the other hand, if the pollution level is gradually reduced, the LED may emit light that changes from a yellow color to a green color. Thus, a variation in resistance valve of the power supplied into the light emitting device 33 according to the air pollution level detected by the odor sensor 64 may be stored in a memory (not shown) in a look-up table form. Also, when the value of the detected air pollution level is transmitted to a controller (not shown), the controller may calculate the resistance valve of the power supplied into the light emitting device 33 to supply power corresponding to the calculated resistance value into the light emitting device 33. Thus, the light emitting device 33 may emit light having a color corresponding to the detected air pollution level.

The module cover 34 may be stepped at least once or more so that a central portion of the module cover 34 further protrudes forward from an edge thereof. Although a first step 341 stepped to protrude forward from inside of the module cover 34 and a second step 342 stepped to protrude forward from the inside of the first step 341 are provided in this embodiment, embodiments are not limited thereto. The first step 341 may have a height h1 equal to or greater or less than a height h2 of the second step 342.

The reason a region of the module cover 34 corresponding to a peripheral portion of the light emitting device 33 protrudes forward, as illustrated in the drawings, is to prevent a hot spot from being generated at a central portion of the module cover 34. In detail, light emitted from the light emitting device 33 may be irradiated forward at a predetermined spread angle. The irradiated light may collide with a rear surface of the module cover 34. If a distance between the light emitting device 33 and the module cover 34 is too short, the light emitted from the light emitting device 33 may not be spread, but rather, may be concentrated into a specific point. An area into which the light is concentrated may be significantly brighter when compared to a peripheral area thereof to generate the hot spot. Thus, to prevent the hot spot from being generated, the module cover 34 and the light emitting device 33 have to be spaced a predetermined distance from each other.

Figure 26:
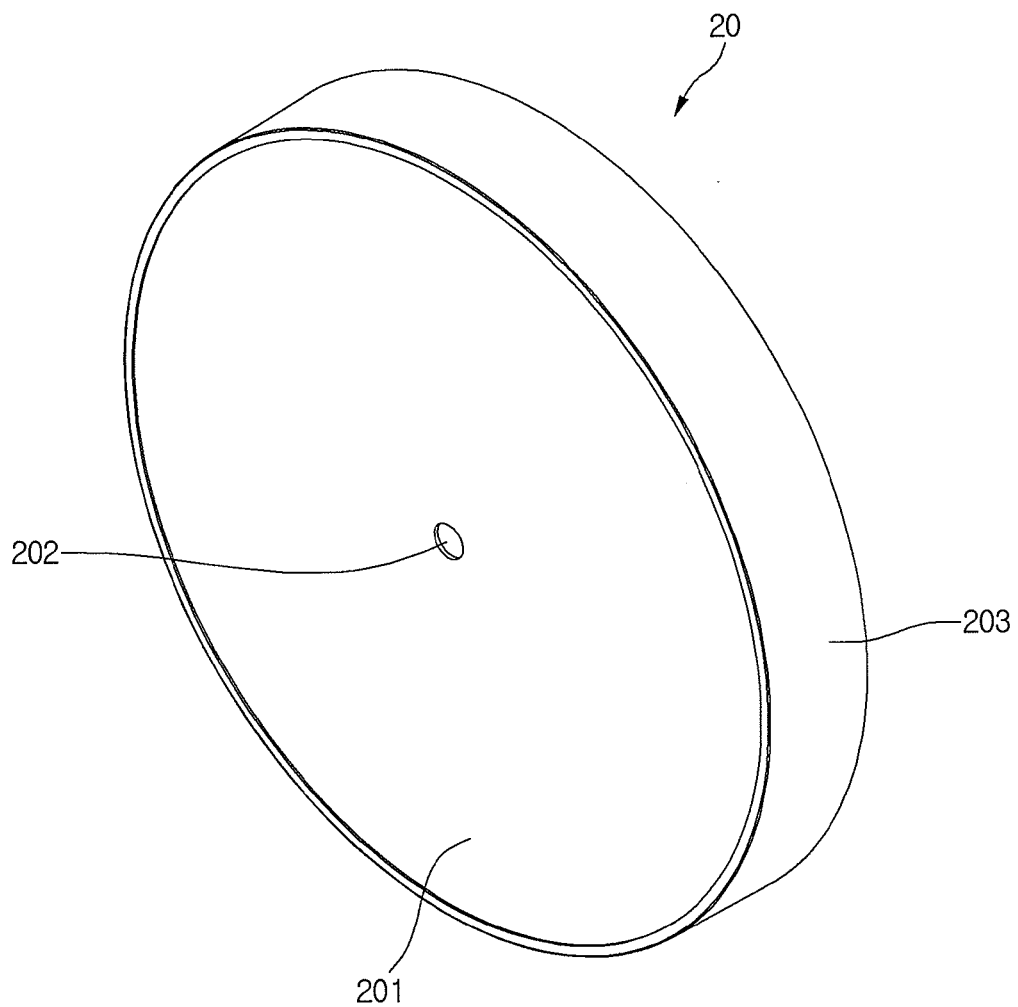
FIG. 26 is a front perspective view of a front case of the air cleaner of FIG. 1.
Figure 27:
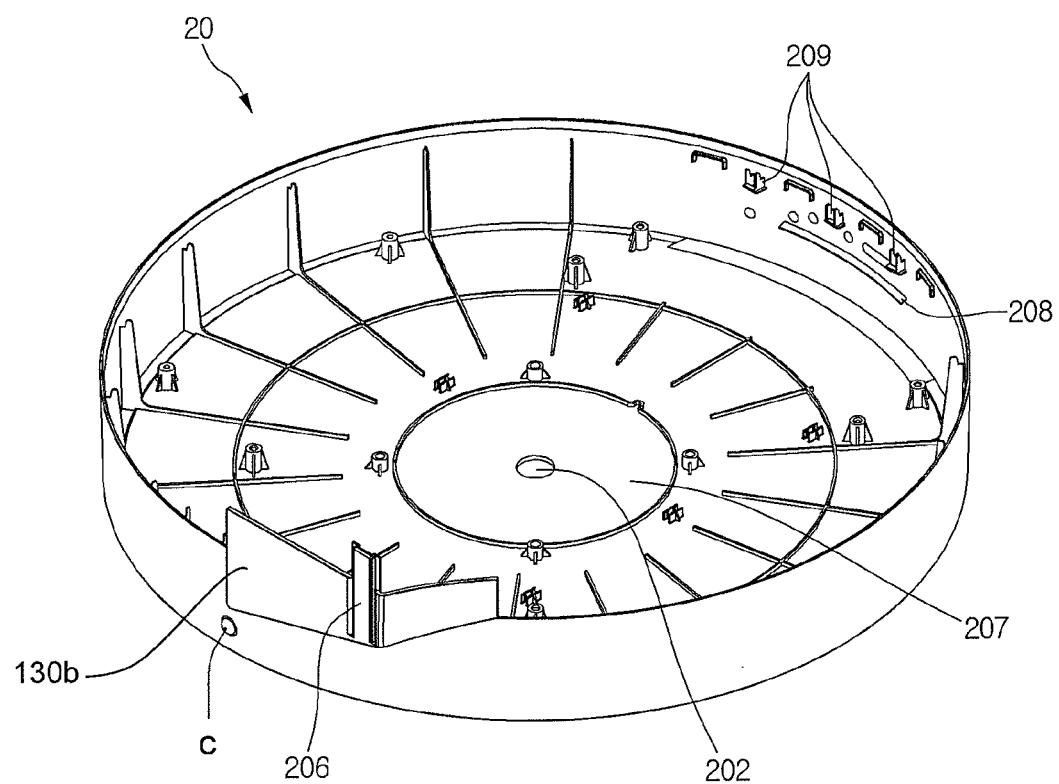
FIG. 27 is a rear perspective of the front case of FIG. 26.

FIG. 26 is a front perspective view of a front case of the air cleaner of FIG. 1. FIG. 27 is a rear perspective view of the front case of FIG. 26.

Referring to FIGS. 26 and 27, the front case 20 according to embodiments may have a circular front surface and a cylindrical side surface 203. A front panel seat surface 201, on which the front panel 11 may be seated, may be disposed on a front surface of the front case 20. A cleanliness display module insertion hole 202, in which a light emitting surface of the cleanliness display module 30 may be inserted, may be defined in a central portion of the front case 20. A cleanliness display module seat 207 may be disposed on a rear surface of the front case 20.

The support protrusion c and the support 130b may be disposed on an outer circumferential surface of the front case 20 that contacts the installation surface. The support 130b may extend from the front case 20 in a shape that is bent in an approximately L-shape. That is, the support 130b may extend downward from the front case 20 and then be bent horizontally. The hook 206 may extend from the support 130b.

A plurality of ribs may be disposed on an inner circumferential surface of the front case 20, that is, an inner circumferential surface of the front case 20 that contacts a top surface of the keypad assembly 61. More particularly, the plurality of ribs may include a plurality of keypad assembly support ribs 209 that support a rear surface of the keypad assembly 61, and a distance maintenance rib 208 that protrudes to prevent static electricity from being generated in the keypad assembly 61.

In detail, if the top surface of the keypad assembly 61 and the inner circumferential surface of the front case 20 are too close to each other, when the user touches the control panel 90, static electricity may be generated around the keypad assembly 61. Thus, to prevent static electricity from being generated, the keypad assembly 61 and the inner circumferential surface of the front case 20 have to be spaced a predetermined distance from each other. For this, the distance maintenance rib 208 may be provided.

Figure 28:
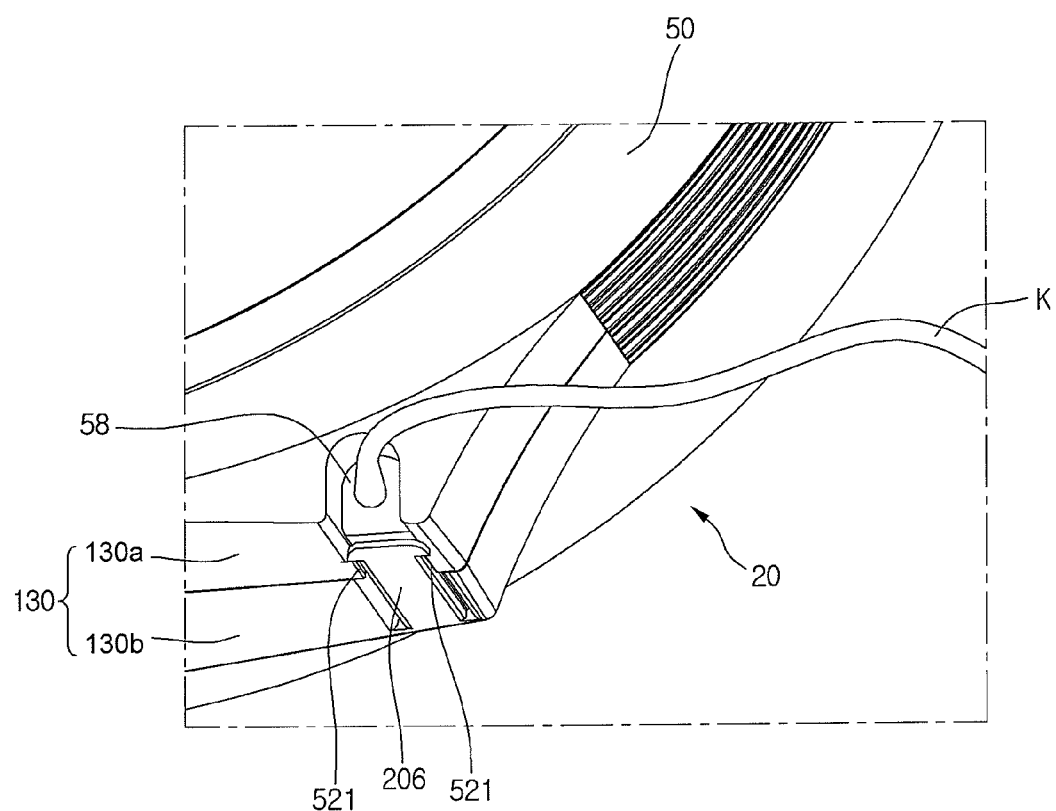
FIG. 28 is a partial perspective view of a support coupling structure disposed on a bottom of the air cleaner of FIG. 1.

FIG. 28 is a partial perspective view of a support coupling structure disposed on a bottom of the air cleaner of FIG. 1. Referring to FIG. 28, the rear support 130a may be disposed on a bottom surface of the rear case 50, and the wire insertion portion 58 may be recessed from an edge of the rear support 130a. A wire K may be inserted into the wire insertion portion 58. This was previously described with reference to FIGS. 18 and 19.

The front support 130b may be disposed on a bottom surface of the front case 20, and the rear support 130b and the front support 130a may be coupled to each other by the hook 206. A hook protrusion 521, on which the hook 206 may be hooked, may protrude from an outer edge of the wire insertion portion 58. Thus, as the hook 206 is hooked on the hook protrusion 521, the rear support 130a and the front support 130b may be coupled to each other as one body.

The hook 206 may cover a portion of an open portion of the wire insertion portion 58 to prevent foreign substances from being introduced into the open portion of the wire insertion portion 58. In addition, a portion of the wire K may be covered by the hook 206, and separation of the wire K from the wire insertion portion 58 may be prevented.

Figure 29:
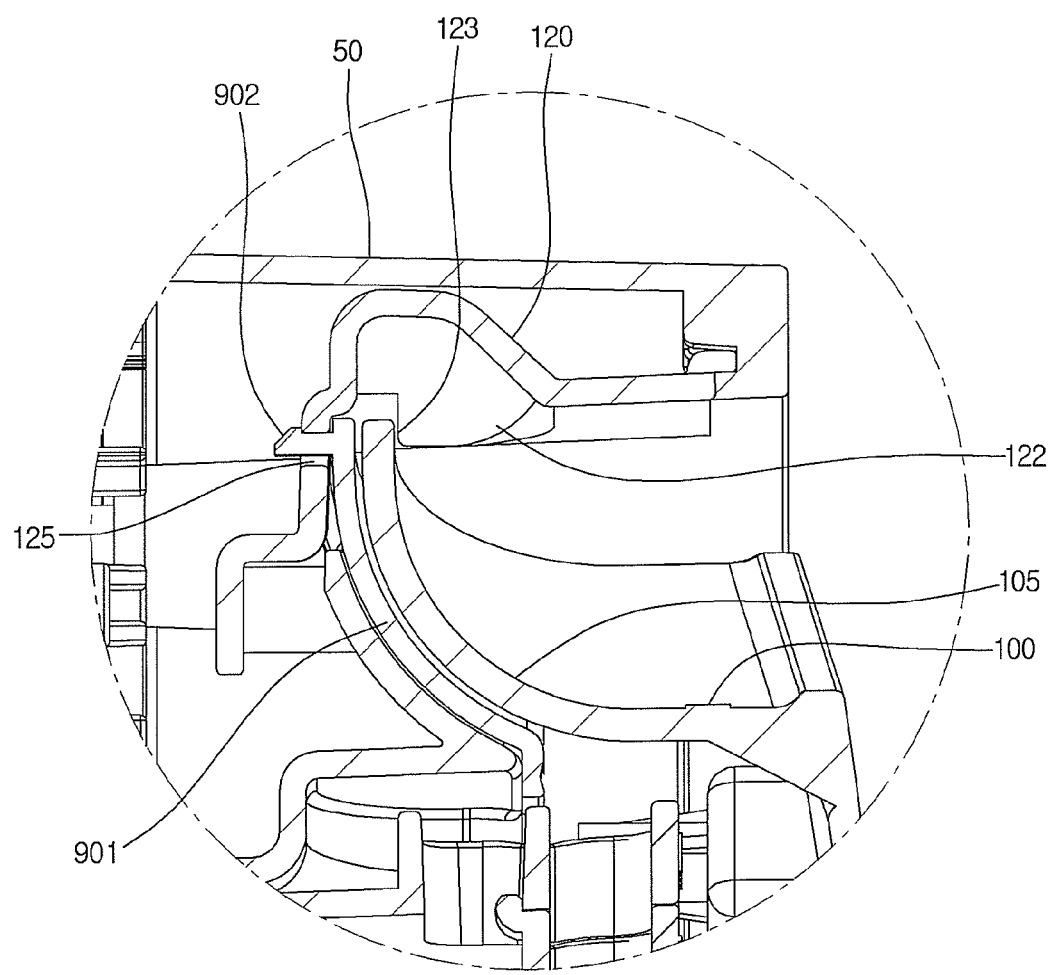
FIG. 29 is an enlarged view illustrating a portion A of FIG. 5.

FIG. 29 is an enlarged view illustrating a portion A of FIG. 5. Referring to FIG. 29, the coupling hook 902, which may protrude from the front surface of the grasp guide 901 of the rear cover 900, may be inserted into the hook hole 125 of the handle 120. The edge of the grasp guide 105 of the rear panel 100 may be hooked and fixed to the hook protrusion 123 of the hook rib 122 extending from the bottom surface of the handle 120. The user's hand may be inserted into the grasp groove 121 defined in the bottom surface of the handle 120 along the grasp guide 105.

The air cleaning apparatus or air cleaner according to embodiments may provide at least the following advantages.

First, a cleanliness display module including a light emitting device may be disposed on a front surface of the air cleaner. The light emitting device may emit light having different colors from each other according to an air pollution level to allow a user to easily predict cleanliness of indoor air.

Second, a front panel formed of a metal material may be disposed on the front surface of the air cleaner, and a hairline may be formed to diffuse light in a radial direction of the air cleaner, thereby improving an esthetic sense.

Third, an image or moving picture may be displayed on the front panel to allow the front panel to serve as a display unit or display.

Fourth, a bottom of the air cleaner may be supported by three points to prevent the air cleaner from being shaken as the air cleaner is disposed on an installed surface.

Fifth, a plurality of filters may be replaced and mounted as one assembly and have different colors from each other to allow a user to easily distinguish the filters.

Embodiments disclosed herein provide an air cleaning apparatus or air cleaner include a circular filter assembly, in which a plurality of filters may be stacked; a circular rear case that may including a mount sleeve, on which the filter assembly may be mounted; a circular middle case, on which a discharge grille may be disposed, the middle case being coupled to a front surface of the rear case; a circular front case coupled to a front surface of the middle case; and a circular front panel attached to a front surface of the front case. The filter assembly may include a first filter; a second filter disposed at a rear side of the first filter to accommodate the first filter; and a third filter disposed at a rear side of the second filter to accommodate the second filter. Edges of front surfaces of the first to third filters may be flush with each other.

The first filter may include a circular filter frame; a support rib disposed inside the filter frame; and a superfine filter attached to the filter frame and the support rib to filter foreign substances. The second filter may include a ring-shaped filter cover having open front and rear surfaces, and a filter member accommodated into the filter cover. The filter member may include a HEPA filter that filters fine dust. The third filter may include a filter case; a deodorization filter seated on the filter case, including a first deodorization filter that filters at least an ammonia component; and a second deodorization filter that filters at least acetic acid component.

A front surface of the filter frame, a front surface of the filter cover, and a front surface of the filter case may be flush with each other in a state in which the first to third filters are coupled to each other. The filter frame, the filter cover, and the filter case may be distinguished by colors different from each other.

The air cleaning apparatus may further include a plurality of coupling protrusions that protrude from an edge of the filter frame, and a plurality of coupling holes disposed on the filter cover to respectively accommodate the plurality of coupling protrusions.

The air cleaning apparatus may further include at least one first fixing protrusion disposed on a side surface of the filter cover to protrude in a shape recessed inward from the outside, thereby holding the filter member; and at least one second fixing protrusion disposed on a side surface of the filter case to protrude in a shape that is recessed inward from the outside, thereby being inserted into the first fixing protrusion. The air cleaning apparatus may further include at least one filter fixing protrusion that protrudes from an inner circumferential surface of the mount sleeve. The filter fixing protrusion may be inserted into the second fixing protrusion. The air cleaning apparatus may further include grasp parts or grasps that, respectively, protrude from edges of the filter frame, the filter cover, and the filter case. The grasp parts may be disposed adjacent to each other in a radial direction of the filter assembly.

A grasp groove, in which a user's finger may be inserted, may be defined in each of the grasp parts, and a guide groove that guides the user's finger may be recessed from a rear end of the mount sleeve that corresponds to each of the grasp parts. The guide groove may communicate with the grasp groove of the grasp part disposed on the filter case.

The air cleaning apparatus may further include a rear panel coupled to a rear surface of the rear case, and a cover panel coupled to the rear panel at a rear side of the rear panel. The rear panel may include an air suction hole defined with a predetermined size in an inside thereof, and a plurality of hook holes defined along an edge of the air suction hole. The cover panel may include a plurality of coupling hooks that protrude from an edge of a front surface of the cover panel, and respectively, inserted into the hook holes.

A gap may be defined between the rear panel and the cover panel by the coupling hook, and air suctioned through the gap may pass through the air suction hole and be introduced into the filter assembly. The air suctioned through the air suction hole may be purified while successively passing through the first filter, the second filter, and the third filter and be discharged through the discharge grille.

The details of one or more embodiments are set forth in the accompanying drawings and the description below. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner, comprising:
a circular filter assembly, in which a plurality of filters are stacked;
a circular first case comprising a filter mount sleeve, on which the filter assembly is mounted;
a circular second case, on a portion of which a discharge grille is disposed, the second case being coupled to a first surface of the first case;
a circular third case coupled to a first surface of the second case; and
a circular first panel attached to a first surface of the third case, wherein the filter assembly comprises:
a first filter;
a second filter disposed at a side of the first filter to accommodate the first filter; and
a third filter disposed at a side of the second filter to accommodate the second filter, wherein edges of surfaces of the first to third filters are flush with each other, wherein the first filter comprises:
a circular filter frame;
a support rib disposed inside of the filter frame; and
a superfine filter attached to the filter frame and the support rib to filter foreign substances, wherein the second filter comprises:
a ring-shaped filter cover having open front and rear surfaces; and
a filter member accommodated in the filter cover, wherein the filter member comprises a HEPA filter to filter fine dust, wherein the third filter comprises:
a filter case;
at least one deodorization filter seated on the filter case, wherein the air cleaner further comprises:
at least one first fixing protrusion disposed on or in a circumferential surface of the filter cover to protrude in a shape such that it is recessed inward from the outside, thereby holding the filter member;
at least one second fixing protrusion disposed on or in a circumferential surface of the filter case to protrude in a shape such that it is recessed inward from the outside, thereby being inserted into the at least one first fixing protrusion; and
at least one filter fixing protrusion that protrudes from a circumferential surface of the filter mount sleeve, wherein the at least one filter fixing protrusion is inserted into the at least one second fixing protrusion.

2. The air cleaner according to claim 1, wherein the at least one deodorization filter comprises:
a first deodorization filter to filter at least an ammonia component; and
a second deodorization filter to filter at least an acetic acid component.

3. The air cleaner according to claim 1, wherein a first surface of the filter frame, a first surface of the filter cover, and a first surface of the filter case are flush with each other in a state in which the first to third filters are coupled to each other.

4. The air cleaner according to claim 3, wherein the filter frame, the filter cover, and the filter case are distinguished by colors different from each other.

5. The air cleaner according to claim 1, further comprising:
a plurality of coupling protrusions that protrude from an edge of the filter frame; and
a plurality of coupling holes disposed on the filter cover to respectively accommodate the plurality of coupling protrusions.

6. The air cleaner according to claim 1, further comprising grasps, respectively, that protrude from edges of the filter frame, the filter cover, and the filter case.

7. The air cleaner according to claim 6, wherein the grasps are disposed adjacent to each other in a radial direction of the filter assembly.

8. The air cleaner according to claim 7, wherein a grasp groove configured to receive a user's finger is provided in each of the grasps, and wherein a guide groove to guide the user's finger is recessed from a rear end of a filter mount sleeve to correspond to each of the grasps.

9. The air cleaner according to claim 8, wherein the guide groove communicates with the grasp groove of the grasp disposed on the filter case.

10. The air cleaner according to claim 1, further comprising:
a second panel coupled to a second surface of the first case; and
a cover panel coupled to the second panel.

11. The air cleaner according to claim 10, wherein the second panel comprises:
an air suction hole having a predetermined size; and
a plurality of hook holes provided along an edge of the air suction hole, wherein the cover panel comprises a plurality of coupling hooks that protrudes from an edge of a surface of the cover panel, and is configured to be, respectively, inserted into the plurality of hook holes.

12. The air cleaner according to claim 11, wherein a gap is defined between the second panel and the cover panel by the plurality of coupling hooks, and air suctioned through the gap passes through the air suction hole and is introduced into the filter assembly.

13. The air cleaner according to claim 12, wherein the air suctioned through the air suction hole is purified while successively passing through the first filter, the second filter, and the third filter and is discharged through the discharge grille.

* * * * *